US012629946B1

(12) United States Patent
Takahashi

(10) Patent No.: US 12,629,946 B1
(45) Date of Patent: May 19, 2026

(54) PRINTER

(71) Applicant: CITIZEN SYSTEMS JAPAN CO., LTD., Tokyo (JP)

(72) Inventor: Akira Takahashi, Tokyo (JP)

(73) Assignee: CITIZENS SYSTEMS JAPAN CO., LTD., Tokyo (JP)

( * ) Notice: Subject to any disclaimer, the term of this patent is extended or adjusted under 35 U.S.C. 154(b) by 0 days.

(21) Appl. No.: 19/121,358

(22) PCT Filed: Oct. 11, 2023

(86) PCT No.: PCT/JP2023/036835
§ 371 (c)(1),
(2) Date: Apr. 15, 2025

(87) PCT Pub. No.: WO2024/095723
PCT Pub. Date: May 10, 2024

(30) Foreign Application Priority Data

Nov. 2, 2022 (JP) ................................ 2022-176250
Jul. 20, 2023 (JP) ................................ 2023-118020

(51) Int. Cl.
*B41J 35/00* (2006.01)
*B41J 11/66* (2006.01)
*B41J 11/70* (2006.01)
*B65H 35/00* (2006.01)

(52) U.S. Cl.
CPC ............ *B41J 11/706* (2013.01); *B41J 11/663* (2013.01); *B65H 35/006* (2013.01); *B65H 35/0086* (2013.01); *B65H 2301/515323* (2013.01); *B65H 2301/515326* (2013.01); *B65H 2403/41* (2013.01); *B65H 2801/24* (2013.01)

(58) Field of Classification Search
CPC ..... B41J 11/663; B41J 11/706; B65H 35/006; B65H 35/0086; B65H 2301/515323; B65H 2301/515326; B65H 2403/41; B65H 2801/24
See application file for complete search history.

(56) References Cited

FOREIGN PATENT DOCUMENTS

| | | |
|---|---|---|
| CN | 213140873 U | 5/2021 |
| JP | S54-002584 A | 1/1979 |
| JP | H0674990 A | 3/1994 |

(Continued)

OTHER PUBLICATIONS

International Search Report from corresponding Application No. PCT/JP2023/036835, mailed on Nov. 21, 2023, 4 pages with translation.

*Primary Examiner* — Christopher E Mahoney
*Assistant Examiner* — Marissa Ferguson-Samreth
(74) *Attorney, Agent, or Firm* — Tucker Ellis LLP

(57) ABSTRACT

A printer includes a motor including a rotating shaft; a pinion gear that is fixed to the rotating shaft and rotates integrally with the rotating shaft; a reduction gear that transmits a rotation of the pinion gear at a reduced speed; a drive gear that receives the rotating shaft in a state in which a rotation of the rotating shaft is not directly transmitted to the drive gear, the drive gear rotating on the rotating shaft with the rotations of the pinion gear and the reduction gear; a drive rotary blade that is integral with the drive gear and rotates coaxially with the drive gear; a driven rotary blade that rotates by partially contacting the drive rotary blade; and a slitter portion that cuts a paper that passes between the drive rotary blade and the driven rotary blade in a transport direction orthogonal to the rotating shaft.

9 Claims, 17 Drawing Sheets

(56) References Cited

FOREIGN PATENT DOCUMENTS

| | | | |
|---|---|---|---|
| JP | 2000343492 | A | 12/2000 |
| JP | 2001105383 | A | 4/2001 |
| JP | 3156322 | U | 12/2009 |
| JP | 6074990 | B2 | 2/2017 |

PRINTER

CROSS-REFERENCE TO RELATED APPLICATION

The present application is a national stage of International Application No.: PCT/JP 2023/036835, which was filed on Oct. 11, 2023, and which claims the benefit of priority from each of Japanese Patent Application No. 2022-176250 filed to the Japan Patent Office on Nov. 2, 2022, and Japanese Patent Application No. 2023-118020 filed to the Japan Patent Office on Jul. 20, 2023, the disclosures of which are incorporated in their entireties in the present specification by reference.

TECHNICAL FIELD

The present disclosure relates to a printer.

BACKGROUND ART

In order to obtain printing outputs with different widths without preparing multiple paper types, there are printers with a slitter function that cuts a printed paper with a large width into a desired smaller width.

For example, the printer disclosed in Japanese Patent Application Publication No. 2001-105383 (Patent Literature 1) includes rotary blades for cutting a paper, which are mounted on the same shaft as that of a transport roller that transports the paper. When the paper is cut, the rotary blades are moved to predetermined cutting positions, and the rotary blades are rotated by rotating the transport roller to cut the paper passing through a transport path.

Each printer disclosed in Japanese U.S. Pat. No. 6,074, 990 and Chinese Utility Model Publication No. 213140873 (Patent Literatures 2 and 3) includes a rotary blade mounted on a rotating shaft of a motor. When a paper is cut, the rotary blade is moved to a predetermined cutting position, and the rotary blade is rotated by rotating the motor to cut the paper.

SUMMARY

However, in the printer disclosed in Patent Literature 1, the mechanism for moving the rotary blades to the cutting positions requires an installation space larger than the width of the paper, which results in an increase in the overall size of the printer.

Each of the printers disclosed in Patent Literatures 2 and 3 requires a smaller installation space than that of Patent Literature 1, but a larger motor has been necessary to obtain the torque required for cutting the paper. Therefore, it has been difficult to install the motor within the limited space of the paper discharge outlet.

An object of the present disclosure is to provide a printer that includes a slitter portion that requires a reduced installation space.

To achieve the object, a printer includes a motor including a rotating shaft; a pinion gear that is fixed to the rotating shaft and is configured to rotate integrally with the rotating shaft; a reduction gear that is configured to transmit a rotation of the pinion gear at a reduced speed; a drive gear that receives the rotating shaft in a state in which a rotation of the rotating shaft is not directly transmitted to the drive gear, the drive gear being configured to rotate on the rotating shaft in conjunction with the rotation of the pinion gear and a rotation of the reduction gear; a drive rotary blade that is integral with the drive gear and configured to rotate coaxially with the drive gear; a driven rotary blade that is configured to rotate by partially contacting the drive rotary blade; and a slitter portion that is configured to cut a paper that passes between the drive rotary blade and the driven rotary blade in a transport direction orthogonal to the rotating shaft.

DETAILED DESCRIPTION

An embodiment of the printer according to the present disclosure will be described in the following with reference to the drawings.

First Embodiment

[Total Configuration] With reference to FIGS. 1-6, the first embodiment of the printer will be described.

Figure 1:
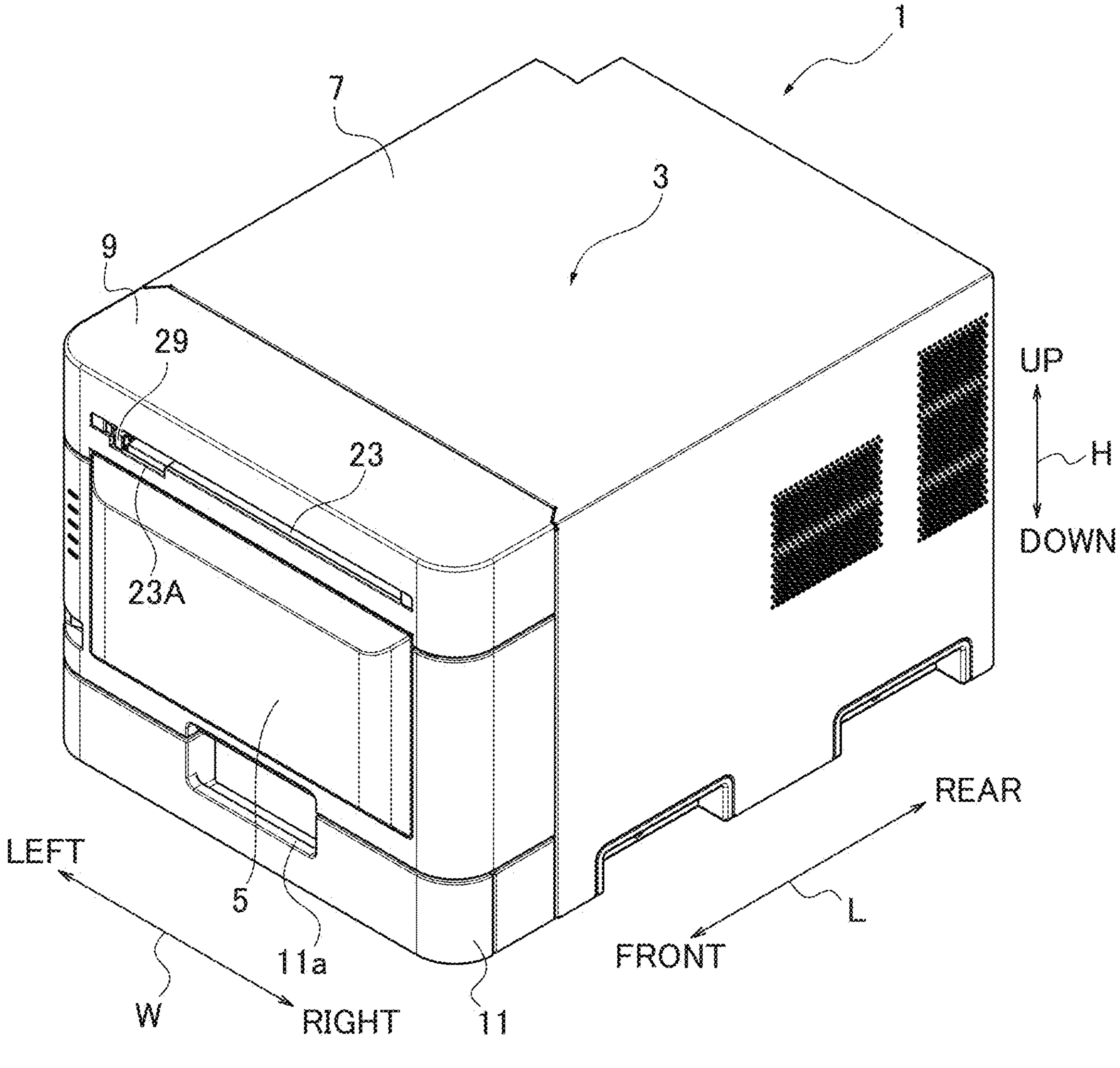
FIG. 1 is a perspective view showing an external appearance of a printer according to a first embodiment.
Figure 2:
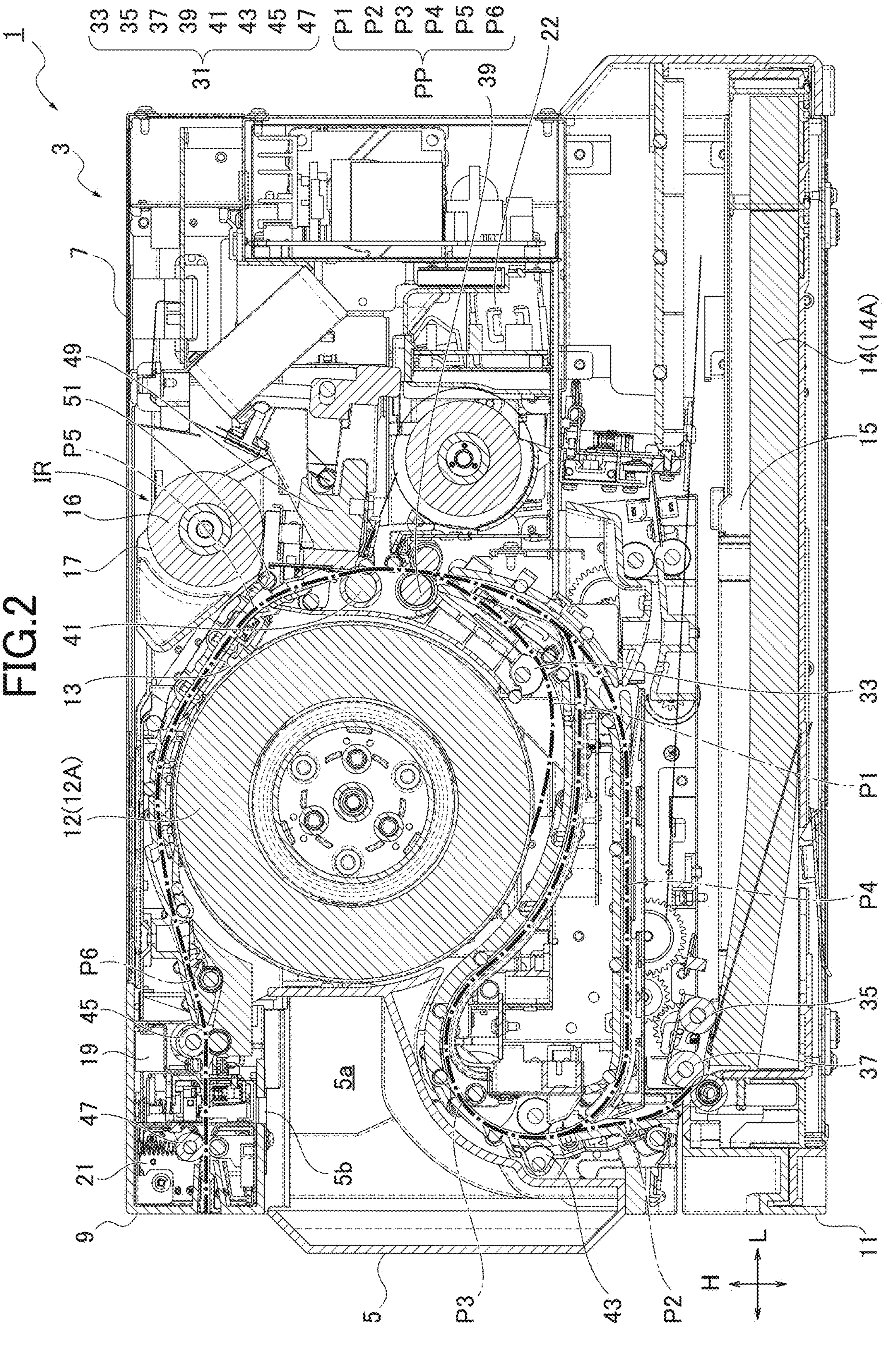
FIG. 2 is a cross-sectional view taken along a vertical plane that extends in a front-rear direction and passes through the center in the width direction of the printer.

FIG. 1 is a perspective view showing an external appearance of a printer 1. FIG. 2 is a cross-sectional view taken along a vertical plane that extends in a front-rear direction L and passes through the center in the width direction W of the printer 1.

As shown in FIG. 1, the printer 1 is formed in a rectangular shape as a whole and includes a main body 3 and a trash box 5.

In the present embodiment, the left-right direction (width direction) W, the front-rear direction (longitudinal direction) L, and the up-down direction (height direction) H are defined as shown in FIG. 1.

The main body 3 is formed by covering the outside of a metal frame with a metal outer cover 7, a top front case 9, and a bottom front case 11, which are made of plastic. As shown in FIG. 2, the main body 3 includes a roll-paper storage compartment 13 for storing a roll paper 12, a sheet-paper storage compartment 15 for storing sheet papers 14, and a ribbon storage compartment 17 for storing an ink ribbon unit 16.

The roll-paper storage compartment 13 stores the roll paper 12 prepared by rolling a long strip of paper 12A into a roll. It is possible to replace the roll paper 12 by pulling out the main body 3 from the outer cover 7, rotating a front top portion of the main body 3, which includes the top front case 9, upward, and then removing the trash box 5.

As shown in FIG. 2, the sheet-paper storage compartment 15 is provided at the bottom of the printer 1 and is disposed below the roll-paper storage compartment 13. The sheet-paper storage compartment 15 stores the sheet papers 14, which have been cut into a predetermined size and stacked up in the thickness direction, and supplies a paper 14A.

The sheet-paper storage compartment 15 is covered with the bottom front case 11. The sheet-paper storage compartment 15 is configured to be drawn forward independently of the main body 3 by pulling it forward in the front-rear direction L with a finger placed on a fingerhold 11*a* formed on an upper part of the bottom front case 11. The sheet-paper storage compartment 15 is opened at its top when drawn forward, allowing the sheet papers 14 to be inserted into or removed from the compartment through the open top.

The top front case 9 is disposed at a front top portion of the main body 3. The top front case 9 is disposed to be opposed to a cutter unit 19 and a slitter unit 21, which are disposed at the front top portion of the main body 3, and covers the cutter unit 19 and the slitter unit 21.

An outlet 23 is formed on the front surface of the top front case 9 to discharge the paper 12A, 14A from the inside of the main body 3 to the outside. The outlet 23 is formed longer than the width of the paper 12A, 14A. The outlet 23 is formed with a recess 23A to expose a portion 29 of the slitter portion 25, which is described later. The exposed portion 29 is movable in the recess 23A in the left-right direction. The exposed portion 29 is located at the left end of the recess 23A when slitting is not performed on the paper. The exposed portion 29 is located at the right end of the recess 23A when slitting is performed on the paper.

Besides these roll-paper storage compartment 13, sheet-paper storage compartment 15 and ribbon storage compartment 17, the main body 3 includes a power supply, a paper transport section, a ribbon transport section, the cutter unit 19, the slitter unit 21, a controller 22, etc.

The trash box 5 is removably provided in the main body 3 to close a front opening of the main body 3. As shown in FIG. 1, the trash box 5 is engaged with the main body 3 in a closed state to maintain the closed state, and can be removed from the main body 3 by pulling it forward to disengage it. The trash box 5 is engaged with the main body 3 for attachment by pushing it rearward in direction R from a state in which the trash box 5 is removed from the main body 3, thereby maintaining the attached state.

The trash box 5 has an open top and formed into a box shape including an interior space 5*a*. An opening 5*b* at the top of the trash box 5 is positioned to face the cutter unit 19.

When the cutter unit 19 cuts off a margin of the paper 12A, 14A as an elongate piece extending in the width direction W of the paper 12A, 14A, the paper piece falls down and is then stored in the interior space 5*a* of the trash box 5 through the opening 5*b*.

The main body 3 is provided with an ink ribbon section IR that is configured to transport an ink ribbon T of the ink ribbon unit 16 stored in the ribbon storage compartment 17. The ink ribbon T is a strip-shaped sheet in which ink areas of yellow Y, magenta M, and cyan C and an area of overcoat OP are repeatedly and alternately arranged in the longitudinal direction. It is possible to replace the ink ribbon unit 16 by pulling out the main body 3 from the outer cover 7.

The main body 3 is provided with a transport mechanism 31 that transports the paper 12A from the roll-paper storage compartment 13 along a transport path PP and transports the paper 14A from the sheet-paper storage compartment 15 along the transport path PP. The transport path PP is a pathway shown by a single-point chain line in FIG. 2. In the present embodiment, the transport direction from the paper feeding position (roll-paper storage compartment 13 and sheet-paper storage compartment 15) to the outlet 23 is defined as the forward direction, and the opposite of this direction is defined as the reverse direction. The paper 12A, 14A is transported in the transport path PP by the transport mechanism 31 in the forward and reverse directions and is finally discharged from the outlet 23.

The transport path PP includes a roll-paper feeding path P1, a sheet-paper feeding path P2, a feeding path P3, an inverting path P4, a printing path P5, and a discharge path P6. Along the transport path PP, the transport mechanism 31 includes a roll-paper delivery roller 33, a sheet-paper delivery roller 35, a sheet-paper feeding roller 37, a gripping roller 39, a platen roller 41, an inverting roller 43, a cutter-portion roller 45, and a slitter-portion roller 47.

The roll-paper delivery roller 33 holds the paper 12A extending from the roll paper 12 and transports it to the gripping roller 39. The sheet-paper delivery roller 35 makes contact with the top sheet paper 14 of the paper stack and delivers the sheet paper 14 through its rotation. The sheet-paper feeding roller 37 is disposed in the vicinity of the sheet-paper delivery roller 35 and transports the delivered paper 14A to the gripping roller 39 through the feeding path P3. The gripping roller 39 holds and advances the paper 12A, 14A in the forward direction to transport it to the printing path P5. The gripping roller 39 advances the paper 12A, 14A in the reverse direction during printing. When both sides of the paper 14A (sheet paper) are printed, the paper 14A is advanced to the inverting path P4. The platen roller 41 is disposed at a position opposite to the thermal head, which is described later, and supports the paper 12A, 14A against which the ink ribbon is pressed.

The inverting roller 43 is driven when both sides of the paper 14A (sheet paper) are printed. When the back side is printed, the paper 14A is transported by the gripping roller 39 to the inverting path RP of the transport path PP and then is advanced to the feeding path P3 by the inverting roller 43.

The cutter unit 19 includes the cutter-portion roller 45. In cutting a margin of the paper 12A, 14A or cutting the paper 12A from the roll paper 12, the cutter-portion roller 45 advances the paper 12A, 14A to a predetermined position and presses the paper to hold it in place during cutting.

The slitter unit 21 includes the slitter-portion roller 47. The slitter-portion roller 47 advances the paper 12A, 14A toward the outlet 23. As described later, when the paper 12A, 14A is slit, the slitter portion 25 is moved to the transport path, and the paper 12A, 14A is discharged while being cut.

A thermal head 49 is disposed at a position opposite the platen roller 41. The thermal head 49 is disposed opposite the transfer surface of the ink ribbon T, which has been stretched by a guide portion 51, and presses the ink ribbon T, which has been stretched by the guide portion 51 and delivered in synchronization with the paper 12A, 14A, against the paper 12A, 14A, which is transported in the transport path PP, thereby transferring the ink on the transfer surface to the paper 12A, 14A by heat to conduct printing.

Figure 3:
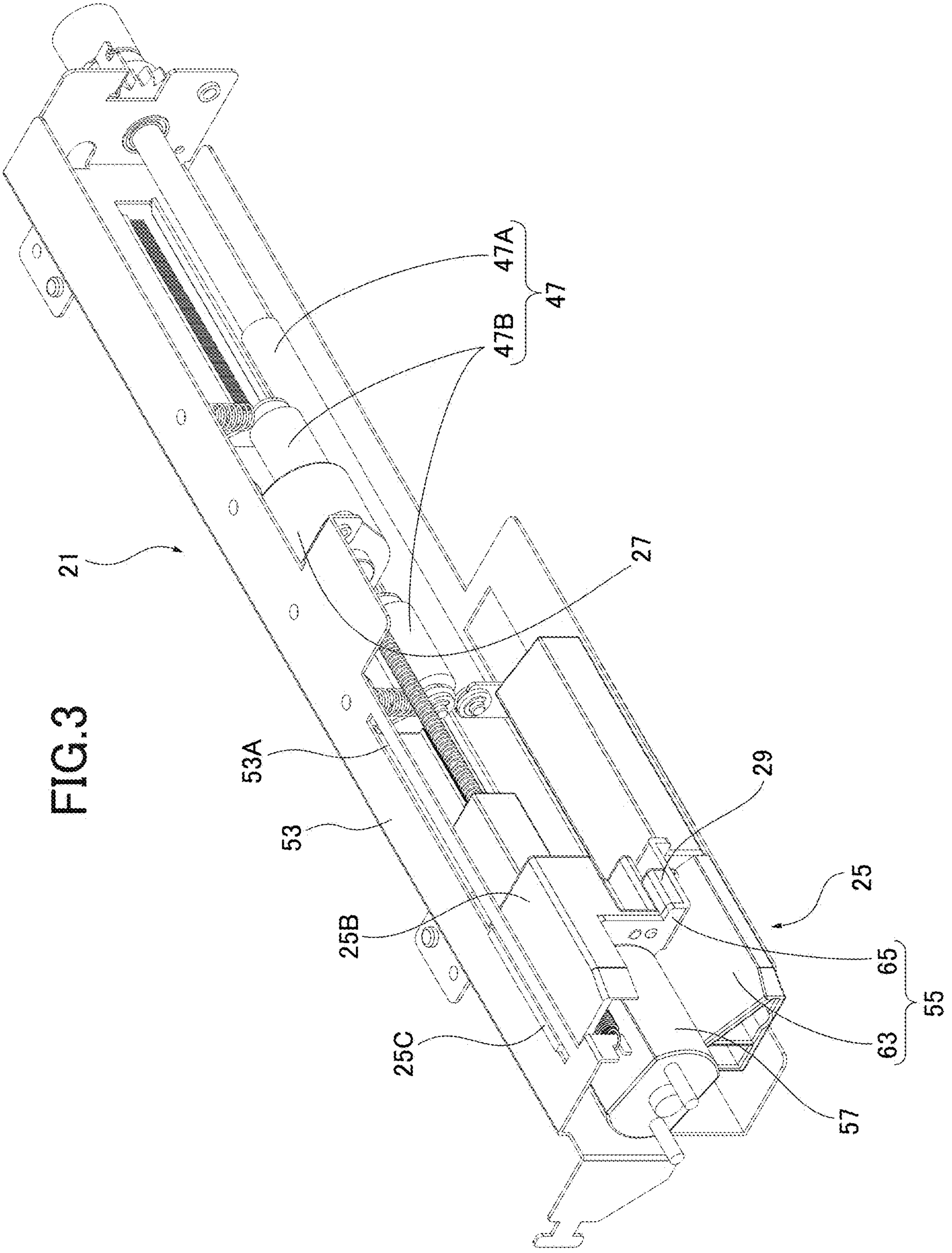
FIG. 3 is a perspective view of a slitter unit detached from a main body.
Figure 4:
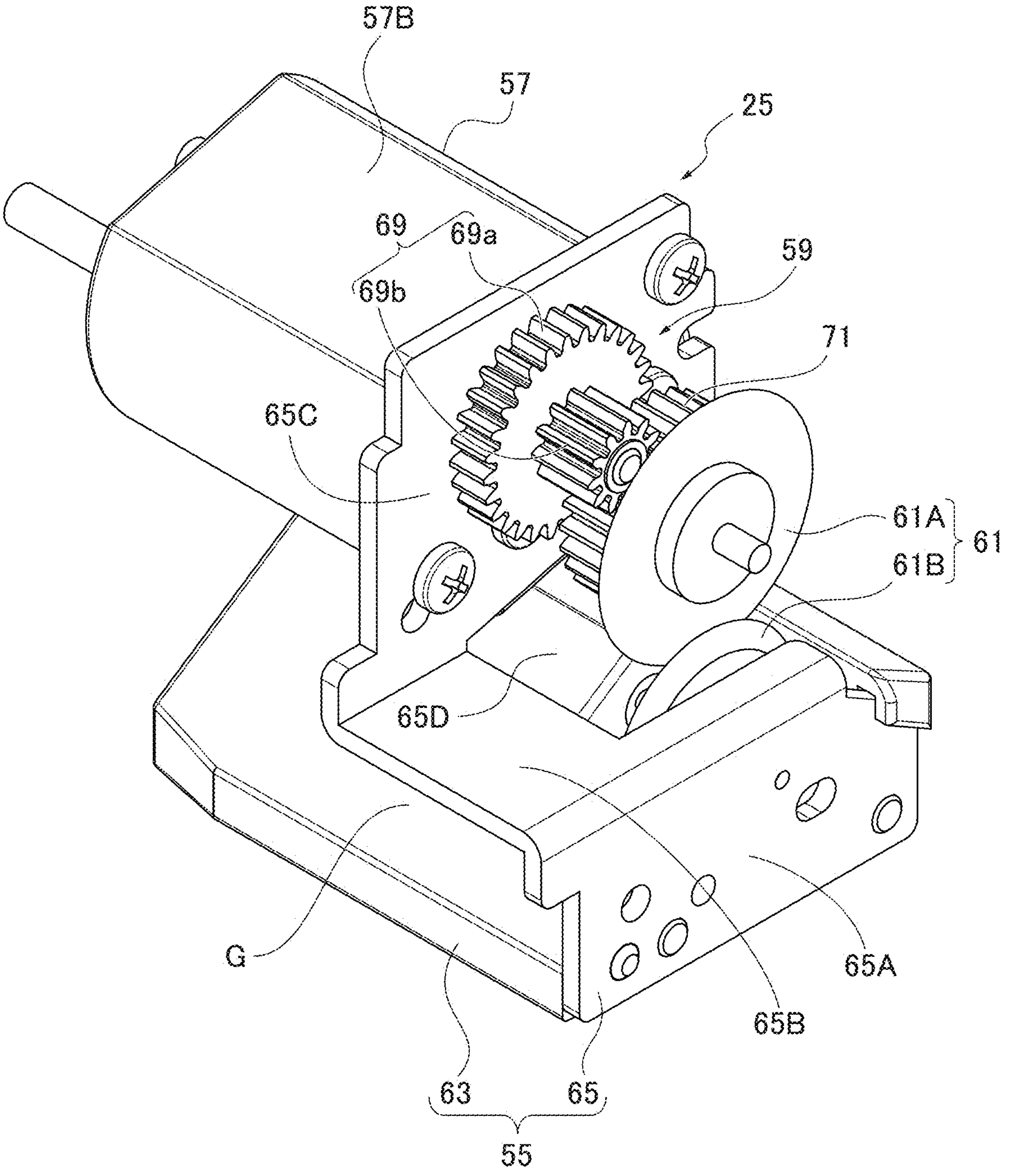
FIG. 4 is a perspective view of a slitter portion.
Figure 5:
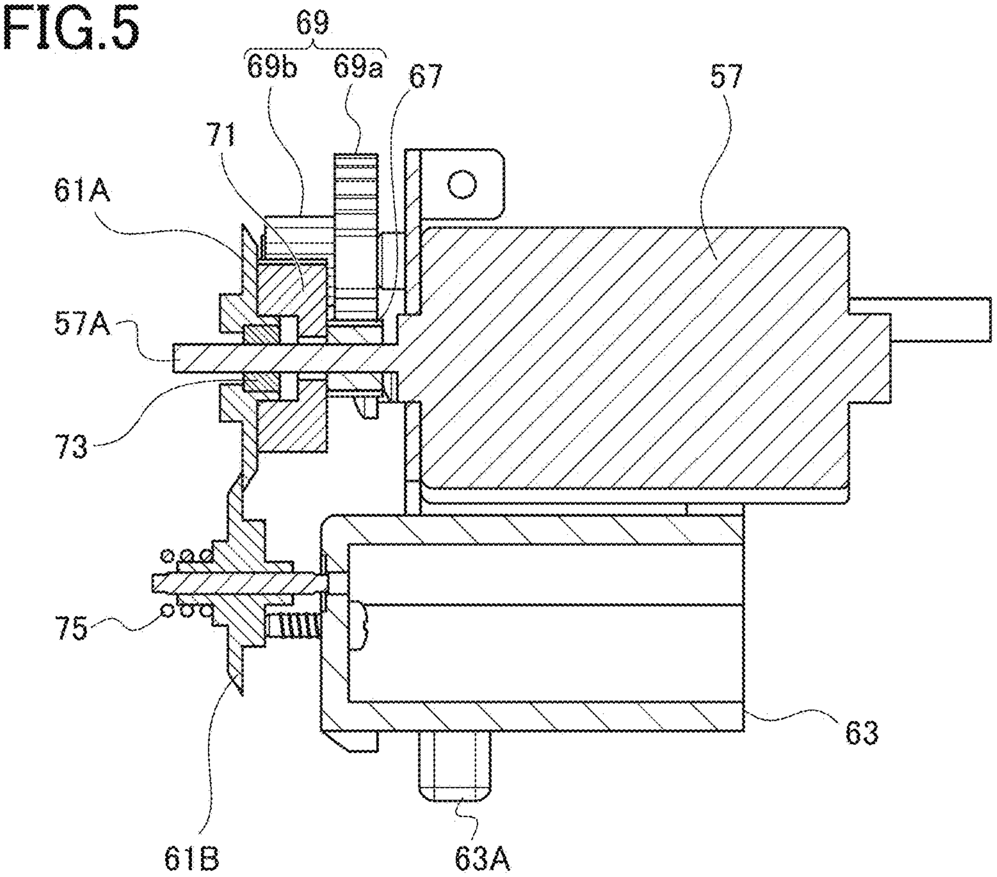
FIG. 5 is a cross-sectional view along a vertical plane that extends in a left-right direction and passes through a rotating shaft of a motor of the slitter portion.
Figure 6:
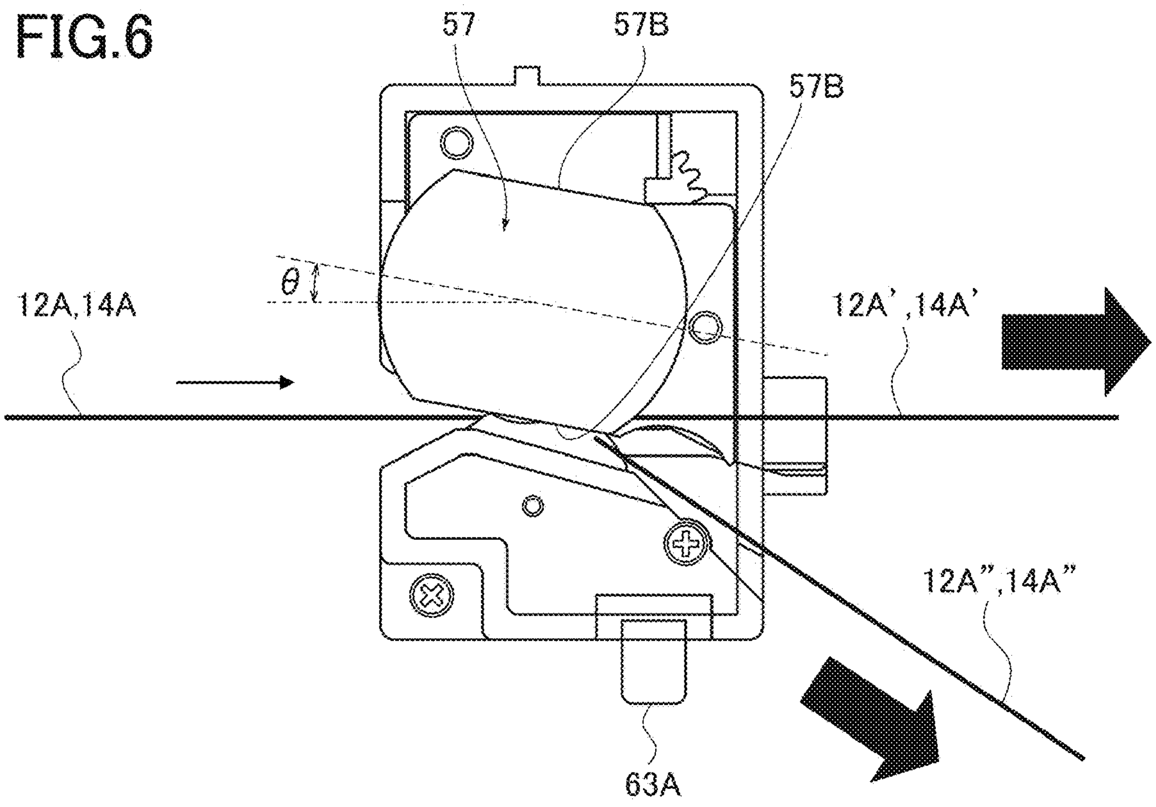
FIG. 6 is a left side view of the slitter portion for describing a condition of a paper passing through the slitter unit.

[Slitter Unit] FIG. 3 is a perspective view of the slitter unit 21 detached from the main body 3. FIG. 4 is a perspective view of the slitter portion 25. FIG. 5 is a cross-sectional view along a vertical plane that extends in the left-right direction and passes through a rotating shaft of a motor of the slitter portion 25. FIG. 6 is a left side view of the slitter portion 25 for describing a condition of the paper passing through the slitter unit 21. In FIG. 5, the internal structure of a motor 57 is omitted.

The slitter unit 21 includes a unit frame 53, the slitter portion 25, a slitter-portion moving mechanism 27, and a slitter-portion roller 47.

The unit frame 53 is a metal frame. The slitter portion 25, the slitter-portion moving mechanism 27, and the slitter-portion roller 47 are attached to the unit frame 53. It is possible to detach the slitter unit 21 from the main body 3 by detaching the unit frame 53 from the main body 3.

The slitter-portion roller 47 includes a drive roller 47A and driven rollers 47B. When the slitter unit 21 is attached to the main body 3, the paper 12A, 14A, which has been transported by the cutter-portion roller 45, is sandwiched between the drive roller 47A and the driven rollers 47B and is advanced toward the outlet 23.

FIGS. 4 and 5 show the slitter portion 25 without a case 25B. As shown in FIGS. 4 and 5, the slitter portion 25 includes a slitter frame 55, the motor 57, a gear train 59, and a set of rotary blades 61 (drive rotary blade 61A and driven rotary blade 61B).

The slitter frame 55 is configured by a base portion (passage member) 63 and a mounting wall portion 65. The mounting wall portion 65 includes a fixed portion 65A fixed to an edge portion of the base portion 63, a flat portion 65B extending along the base portion 63, and a mounting portion 65C extending vertically from an edge portion of the flat portion 65B. The motor 57 and the gear train 59 are mounted on the mounting portion 65C. The flat portion 65B includes a hole 65D partially formed therein. A cutting portion of the set of rotary blades 61 is disposed in the hole 65D.

A gap G is provided between the base portion 63 and the flat portion 65B of the mounting wall portion 65, and an unnecessary portion (paper 12A", 14A") of the paper 12A, 14A, which has been cut by the set of rotary blades 61, passes therethrough.

The motor 57 includes a rotating shaft 57A as an output shaft and an outer peripheral surface (surface covering the rotating shaft 57A from the outside in the radial direction) of its housing includes a pair of flat surfaces 57B, 57B. In the present embodiment, as shown in FIG. 6, the motor 57 is installed in an inclined state by a predetermined angle θ about the rotating shaft 57A relative to the transport path PP (discharge path P6), thereby gradually narrowing the gap G between the paper 12A, 14A, which travels on the transport path PP (discharge path P6), and the flat surface 57B. This is to prevent the paper 12A, 14A from hitting the housing of the motor 57, so that the motor does not interfere with the transport and cutting of the paper. This is also to ensure that, after the paper is cut, the unnecessary portion (paper 12A", 14A") of the cut paper 12A, 14A hits the housing of the motor 57 and then is discharged in a state of hanging down to be lower than a paper portion (paper 12A', 14A') of which width has been adjusted (see FIG. 6). The predetermined angle θ is, for example, 5 to 10 degrees. To conform to the inclination angle of the motor 57, the base portion (passage member) 63 is formed to be substantially parallel to the flat surface 57B and to be inclined relative to the transport path PP (discharge path P6).

The gear train 59 includes a pinion gear 67, a reduction gear 69, and a drive gear 71. The pinion gear 67 is fixed to the rotating shaft 57A and rotates together with the rotating shaft 57A. The reduction gear 69 includes a large-diameter gear 69*a* which is larger than the pinion gear 67 in diameter and a small-diameter gear 69*b* which is smaller than the large-diameter gear 69*a*. The large-diameter gear 69*a* and the small-diameter gear 69*b* are coaxially and integrally formed. The pinion gear 67 meshes with the large-diameter gear 69*a* of the reduction gear 69 to transmit the rotation of the pinion gear 67. The small-diameter gear 69*b* rotates together with the large-diameter gear 69*a*.

The drive gear 71 is such that the rotating shaft 57A is inserted therethrough in a state free from a direct transmission of the rotation of the rotating shaft 57A, thereby being freely rotatable around the rotating shaft 57A. The drive gear 71 meshes with the small-diameter gear 69*b* of the reduction gear 69. As a result, the reduction gear 69 transmits the rotation of the pinion gear 67 to the drive gear 71 at a reduced speed. The drive gear 71 rotates on the rotating shaft 57A (around the rotating shaft 57A) in conjunction with the rotations of the pinion gear 67 and the reduction gear 69.

In the present embodiment, the drive gear 71 is formed to be integral with the drive rotary blade 61A. The drive gear 71 and the drive rotary blade 61A rotate coaxially. The drive rotary blade 61A is attached to the rotating shaft 57A via a bearing 73. In the bearing 73, an outer race is fixed to the drive rotary blade 61A, and an inner race is fixed to the rotating shaft 57A. This configuration can rotate the drive rotary blade 61A with a larger torque than that in the rotation by fixing the drive rotary blade 61A to the rotating shaft 57A of the motor 57.

In the driven rotary blade 61B, its rotation shaft extends between the base portion 63 and the fixed portion 65A. A spring 75 is disposed between the fixed portion 65A and the driven rotary blade 61B, and the driven rotary blade 61B is biased against the drive rotary blade 61A. Therefore, the driven rotary blade 61B is rotated by the rotation of the drive rotary blade 61A, thereby cutting the paper 12A, 14A passing between the drive rotary blade 61A and the driven rotary blade 61B.

The slitter-portion moving mechanism 27 moves the slitter portion 25 so as to position the drive rotary blade 61A and the driven rotary blade 61B at a predetermined position on the transport path PP (discharge path P6) of the paper 12A, 14A. In the present embodiment, the slitter-portion moving mechanism 27 includes a linear stepper motor 27.

In the slitter portion 25, a protrusion 63A (see FIG. 5) provided on the bottom surface of the base portion 63 is slidably fit into a groove (not shown in the drawings) formed in the unit frame 53, and a protrusion 25C formed on the case 25B of the slitter portion 25 is slidably fit into a groove 53A formed in the unit frame 53. Therefore, the slitter portion 25 is movable in the left-right direction with no rotation. With this, when a command to slit the paper 12A, 14A is issued from the controller 22, the linear stepper motor 27 rotates by the command to move the slitter portion 25 from the standby position to the cutting position.

When the paper 12A, 14A is not slit, the slitter portion 25 is positioned at the standby position (condition of FIG. 3), and the paper 12A, 14A is discharged from the outlet 23 by the slitter-portion roller 47.

When the paper 12A, 14A is slit, the slitter portion 25 moves rightward from the standby position to a predetermined cutting position by the command from the controller 22, and the drive rotary blade 61A and the driven rotary blade 61B rotate at this position. In this condition, when the paper 12A, 14A is advanced by the slitter-portion roller 47, as shown in FIG. 6, the paper 12A, 14A is cut by the drive rotary blade 61A and the driven rotary blade 61B, thereby adjusting the paper to have a desired width, and is discharged from the outlet 23. From the outlet 23, the unnecessary portion (paper 12", 14") is also discharged together with the paper 12A, 14A, whose widths have been adjusted. In the present embodiment, the paper 12A, 14A has a width of 8 inches (approximately 20.32 centimeters), and the paper 12A', 14A' cut by the slitter portion has a width of 6 inches (approximately 15.24 centimeters) or 7 inches (approximately 17.78 centimeters). When discharge of the paper is completed, the slitter portion 25 moves leftward and returns to the standby position by the command from the controller 22.

In the following, the printer 1 will be further described.

The printer 1 includes a motor 57 including a rotating shaft 57A; a pinion gear 67 that is fixed to the rotating shaft 57A and configured to rotate integrally with the rotating shaft 57A; a reduction gear 69 that is configured to transmit a rotation of the pinion gear 67 at a reduced speed; a drive gear 71 that receives the rotating shaft 57A in a state in which a rotation of the rotating shaft is not directly transmitted to the drive gear 71, the drive gear 71 being configured to rotate on the rotating shaft 57A in conjunction with the rotation of the pinion gear 67 and a rotation of the reduction gear 69; a drive rotary blade 61A that is integral with the drive gear 71 and configured to rotate coaxially with the drive gear 71; a driven rotary blade 61B that is configured to rotate by partially contacting the drive rotary blade 61A; and a slitter portion 25 that is configured to cut a paper 12A, 14A that passes between the drive rotary blade 61A and the driven rotary blade 61B in a transport direction orthogonal to the rotating shaft 57A.

Thus, in the present disclosure, the rotation of the drive rotary blade via the reduction gear increases the torque generated on the drive rotary blade, as compared with the rotation of the drive rotary blade by fixing the drive rotary blade to the output shaft of the motor. Therefore, even a relatively small motor, which is low in torque generated on the output shaft, can generate on the drive rotary blade a torque sufficient for cutting paper by the drive rotary blade and the driven rotary blade. This allows the present disclosure to reduce the installation space of the slitter portion, as compared with a configuration using a large-size motor with greater torque.

The installation of the drive rotary blade on the rotating shaft of the motor can coaxially arrange the motor and the drive rotary blade. This can reduce the installation space by overlapping the space, which is occupied by the drive rotary blade in the radial direction about the rotating shaft, with the space occupied by the motor. Furthermore, as compared with a configuration in which the rotating shaft of the motor and the shaft of the drive rotary blade are separately coaxially arranged, the fixation of the drive rotary blade to the rotating shaft of the motor can prevent misalignment between those shafts.

In the printer 1, at least a part of an outer peripheral surface of a housing of the motor 57 may include a flat surface 57B. The flat surface 57B may be positioned to face the paper 12A, 14A that travels on the transport path PP (discharge path P6). The motor 57 may be installed in an inclined state by a predetermined angle (θ) about the rotating shaft 57A relative to the transport path such that a gap between the paper 12A, 14A, which travels on the transport path PP (discharge path P6), and the flat surface 57B is gradually narrowed.

This prevents the paper 12A, 14A from hitting the motor 57, so that the motor 57 does not interfere with the transport and cutting of the paper 12A, 14A. After the paper is cut, the unnecessary portion (paper 12A", 14A") of the cut paper 12A, 14A hits the housing of the motor 57 and then is discharged in a state of hanging down to be lower than a paper portion (paper 12A', 14A') of which width has been adjusted.

An opposing surface that is opposed to the flat surface 57B of the motor 57 may be substantially parallel to the flat surface 57B. The opposing surface may include a passage member (base portion) 63 that is formed to be inclined relative to the transport path PP (discharge path P6). This further prevents the disruption of transport and cutting of the paper 12A, 14A.

The drive rotary blade 61A may be fixed to the rotating shaft 57A via a bearing 73 that includes an outer race fixed to the drive rotary blade 61A and an inner race fixed to the rotating shaft 57A. This simple configuration makes it possible to rotate the drive rotary blade 61A on the rotating shaft 57A.

The printer may further include a slitter-portion moving mechanism 27 that is configured to move the slitter portion 25 such that the drive rotary blade 61A and the driven rotary blade 61B are positioned at a predetermined position on a transport path of the paper 12A, 14A. The slitter-portion moving mechanism 27 can move the slitter portion 25 from a position where the paper is not cut to a position where the paper is cut. The position where the paper is cut may be any position within the movable range of the slitter-portion moving mechanism 27.

The width of the paper and the width of the paper after slitting are not limited to specific values. For example, the paper may have a width of 8 inches (approximately 20.32 centimeters). The paper may be cut by the slitter portion 25 to have any width, such as 6 inches (approximately 15.24 centimeters) or 7 inches (approximately 17.78 centimeters).

<Second Embodiment> With reference to FIGS. 7 to 20, the second embodiment of the printer will be described. A printer 100 according to the second embodiment is a printer that is capable of obtaining two sheets of images by printing on the paper two images side by side in the width direction of the paper and cutting it into two portions, as shown in, for example, Japanese Patent Application Publication Nos.

2015-136750 and 2013-129001. The printer 100 according to the second embodiment cuts the paper by using a slitter portion.

Although the printer 100 according to the second embodiment has the same or equivalent parts as those of the printer 1 according to the first embodiment, they will be described once again in the following.

Figure 7:
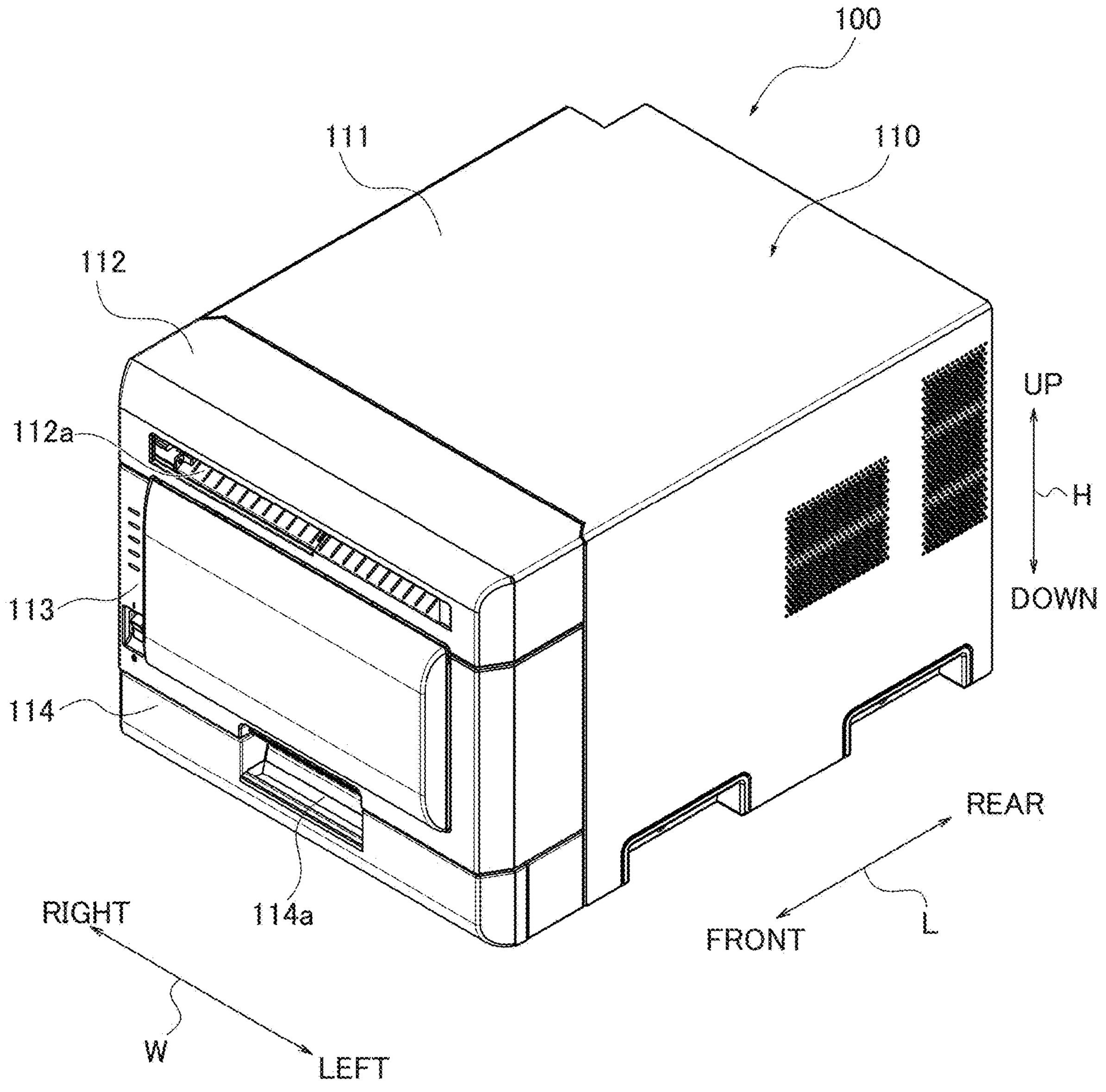
FIG. 7 is a perspective view showing an overall external appearance of a printer according to a second embodiment.
Figure 8:
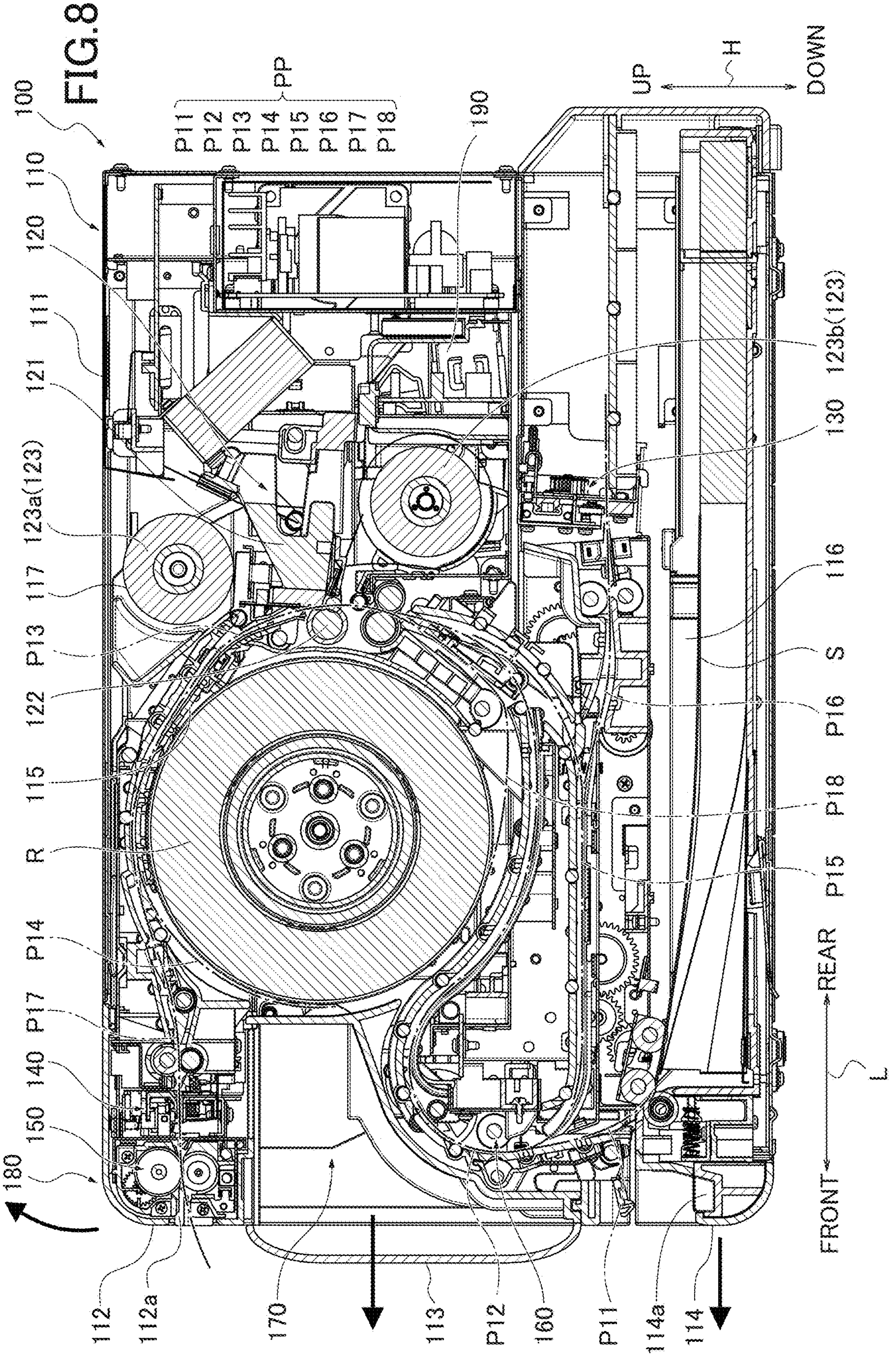
FIG. 8 is a cross-sectional view taken along a vertical plane that includes a front-rear direction and passes through the center in the width direction of the printer.

[Total Configuration] FIG. 7 is a perspective view showing an overall external appearance of the printer 100. FIG. 8 is a cross-sectional view taken along a vertical plane that includes a front-rear direction L and passes through the center in the width direction W of the printer 100.

The printer 100 shown in FIGS. 7 and 8 is one embodiment of a printer according to the present disclosure. The printer 100 is a dye-sublimation thermal printer 100 (hereinafter printer 100) as one example. As shown in FIG. 7, the printer 100 is formed in a rectangular shape as a whole with the width direction W, the front-rear direction L, and the height direction H, which are defined therein. The printer 100 includes a main body 110, a printing section 120, a creaser unit 130, a cutter unit 140, a slitter unit 150, a paper transport section 160, a controller 190, and other elements.

[Main Body] The main body 110 is formed by covering the outside of a metal frame with a metal outer cover 111, and a top front case 112, a middle front case 113, and a bottom front case 114, which are made of plastic.

As shown in FIG. 8, the main body 110 includes a roll-paper storage compartment 115, a sheet-paper storage compartment 116, and a ribbon storage compartment 117. Furthermore, the printing section 120 including a thermal head 121, a platen roller 122 and an ink ribbon unit 123, the creaser unit 130, the cutter unit 140, the slitter unit 150, the paper transport section 160, the controller 190, a power supply, and other elements are disposed in the inside of the main body 110.

Here, the platen roller 122, the ink ribbon unit 123, the cutter unit 140, the slitter unit 150, and a part of a transport path PP where the paper transport section 160 is provided (a part or the entirety of a sheet-paper delivery path P11, a sheet-paper feeding path P12, a roll-paper feeding path P18, a printing standby path P14, a discharge path P17, etc.) are configured to be drawn forward in the front-rear direction as an integral drawer unit 170.

(Roll-paper Storage Compartment) The roll-paper storage compartment 115 is a cylindrical space with an axis along the width direction W and receives a roll paper R (hereinafter referred to as paper R) prepared by winding a long strip of paper into a cylindrical shape. The paper R is, for example, a thick paper onto which a sublimation dye is transferred by diffusion. As shown by the arrow of FIG. 8, the roll-paper storage compartment 115 becomes exposed by pulling forward the drawer unit 170, which is connected to the middle front case, while the top front case 112 is swung upward. In the state that the roll-paper storage compartment 115 is exposed, the roll paper R can be placed into or removed from the compartment.

(Sheet-paper Storage Compartment) As shown in FIG. 8, the sheet-paper storage compartment 116 is provided below the drawer unit 170 and at the bottom of the printer 100. The sheet-paper storage compartment 116 is a rectangular space formed in a tray and is configured to store in the tray rectangular sheet papers S (hereinafter referred to as paper S) that have been cut to a predetermined size and stacked in large quantities in the thickness direction. The paper S is, for example, a thick paper on both sides of which sublimation dye is transferred by diffusion. The papers S, R are not limited to those subjected to diffusion transfer of the sublimation dye.

The sheet-paper storage compartment 116 is covered at its front with the bottom front case 114. A fingerhold 114*a* is formed on the upper part of the bottom front case 114. As shown by the arrow of FIG. 8, the sheet-paper storage compartment 116 is exposed by drawing it forward with one's fingers put on this fingerhold 114*a*. In a state that the tray of the sheet-paper storage compartment 116 is exposed, the sheet paper(s) S can be placed into or removed from the compartment.

The top front case is disposed at a front top portion of the main body 110. The top front case 112 covers the cutter unit 140 and the slitter unit 150, which are disposed at the front top portion of the main body 110.

The top front case 112 is formed at its front surface with an outlet 112*a* that discharges the paper S, R from the inside of the main body 110. The outlet 112*a* is formed to have a length longer than the width of the paper S, R.

[Controller] The controller 190 controls each operation of the printing section 120, the creaser unit 130, the cutter unit 140, the slitter unit 150, the paper transport section 160, and the power supply.

[Paper Transport Section] The paper transport section 160 transports each of the papers S, R along the transport path PP. The paper transport section 160 includes a motor, a drive roller that is driven by the motor, a driven roller that is not driven, but rotates therewith, a switching member that switches the transport path PP, and other elements. The transport path PP includes the sheet-paper delivery path P11, the sheet-paper feeding path P12, a printing path P13, the printing standby path P14, a printing downstream path P15, a creasing path P16, the discharge path P17, and the roll-paper feeding path P18.

The paper transport section 160 delivers the paper S, which is at the top of the stack of the papers (sheet papers) S stored in the sheet-paper storage compartment 116, to the sheet-paper delivery path P11 and sends it to the printing standby path P14 through the sheet-paper feeding path P12 and the printing path P13. At this time, the paper S passes through the printing path P13, but no printing is made on the paper S.

The paper transport section 160 makes a transportation to pull the paper S, which has been sent to the printing standby path P14, back to the printing path P13. While the paper S is transported in the printing path P13, the thermal head 121 prints on the front surface of the paper S, as described hereinafter.

The paper transport section 160 sends the paper S, which has been printed in the printing path P13, to the printing downstream path P15. When the paper S is creased, the paper transport section 160 sends the paper S from the printing downstream path P15 to the creasing path P16, and the creaser unit 130 provided in the creasing path P16 creases the paper S. The paper transport section 160 pulls back the creased paper S from the creasing path P16 to the printing downstream path P15.

The paper transport section 160 sends the paper, which has been sent to the printing downstream path P15, to the sheet-paper feeding path P12. The paper S sent from the printing downstream path P15 to the sheet-paper feeding path P12 is in a state, where its front and back sides have been inverted, resulting from inverting a state where the paper S was sent firstly to the sheet-paper feeding path P12 from the sheet-paper storage compartment 116 through the sheet-paper delivery path p11. In other words, the printing downstream path P15 and the sheet-paper feeding path P12 form an inverting path where the paper S is inverted.

The paper transport section 160 sends the paper S, which has passed through the sheet-paper feeding path P12 after its inversion, to the printing standby path P14 through the printing path P13 in a manner similar to the above, and then pulls it back to the printing path P13. After that, the thermal head 121 prints on the back surface of the paper S in the printing path P13.

The paper transport section 160 passes the paper S, which has been sent to the printing downstream path P15 after the printing on the back surface, through the sheet-paper feeding path P12, the printing path P13 and the discharge path P17 in this order, and then discharges it from the outlet 112*a* to the outside of the printer 100.

Depending on the output condition of the paper S, in the discharge path P17, the cutter unit 140 cuts the paper S along the width direction to remove a portion of the paper, and the slitter unit 150 cuts the paper S into a predetermined width.

The paper transport section 160 sends the paper (roll paper) R, which is stored in the roll-paper storage compartment 115, from its front side, from the roll-paper feeding path P18 to the printing standby path P14 through the printing path P13. At this time, the paper R passes through the printing path P13, but no printing is made on the paper R.

Then, similar to the case of the paper S, the paper transport section 160 makes a transportation to pull the paper R, which has been sent to the printing standby path P14, back to the printing path P13. While the paper R is transported in the printing path P13, the thermal head 121 prints on the paper R. The operation to pull back the paper R through the printing path P13 by the paper transport section 160 returns the printed portion of the paper R to the roll-paper feeding path P18.

The paper transport section 160 discharges the paper R, which has been pulled back to the roll-paper feeding path P18, from the outlet 112*a* to the outside of the printer 100 through the printing path P13 and the discharge path P17.

Depending on the output condition of the paper R, in the discharge path P17, the paper R is cut by the cutter unit 140 along the width direction W to remove it from a portion connected to the roll and is cut by the slitter unit 150 to have a predetermined width.

[Printing Section] The ink ribbon unit 123 is stored in the ribbon storage compartment 117. The ink ribbon unit 123 transports a long strip of ink ribbon wound around a delivery roller 123*a* while winding it around a winding roller 123*b*. The ink ribbon is coated with a sublimation dye.

The thermal head 121 generates heat by the control of the controller 190. The paper S, R passing through the printing path P13 and the ink ribbon stretching between the delivery roller 123*a* and the winding roller 123*b* are sandwiched in a stacked condition between the thermal head 121 and the platen roller 122.

The heat generated by the thermal head 121 causes diffusion transfer of the sublimation dye, which has been applied to the ink ribbon, on the paper S, R. While the paper S, R and the ink ribbon are transported on the printing path P13 in synchronization by the controller 190, the thermal head 121 conducts the diffusion transfer, thereby conducting a predetermined printing on the paper S, R.

[Creaser Unit] The creaser unit 130 is disposed behind the roll-paper storage compartment 115 in the front-rear direction L and between the winding roller 123*b* of the ink ribbon unit 123 and the sheet-paper storage compartment 116 in the height direction. The creaser unit 130 forms a cease, which is a recess extending along the width direction W, on the paper S transported below the roll-paper storage compartment 115 to the creasing path P16 extending along the front-rear direction L. The creaser unit 130 forms a crease on the paper S, thereby making the paper S easier to fold along the crease.

Figure 9:
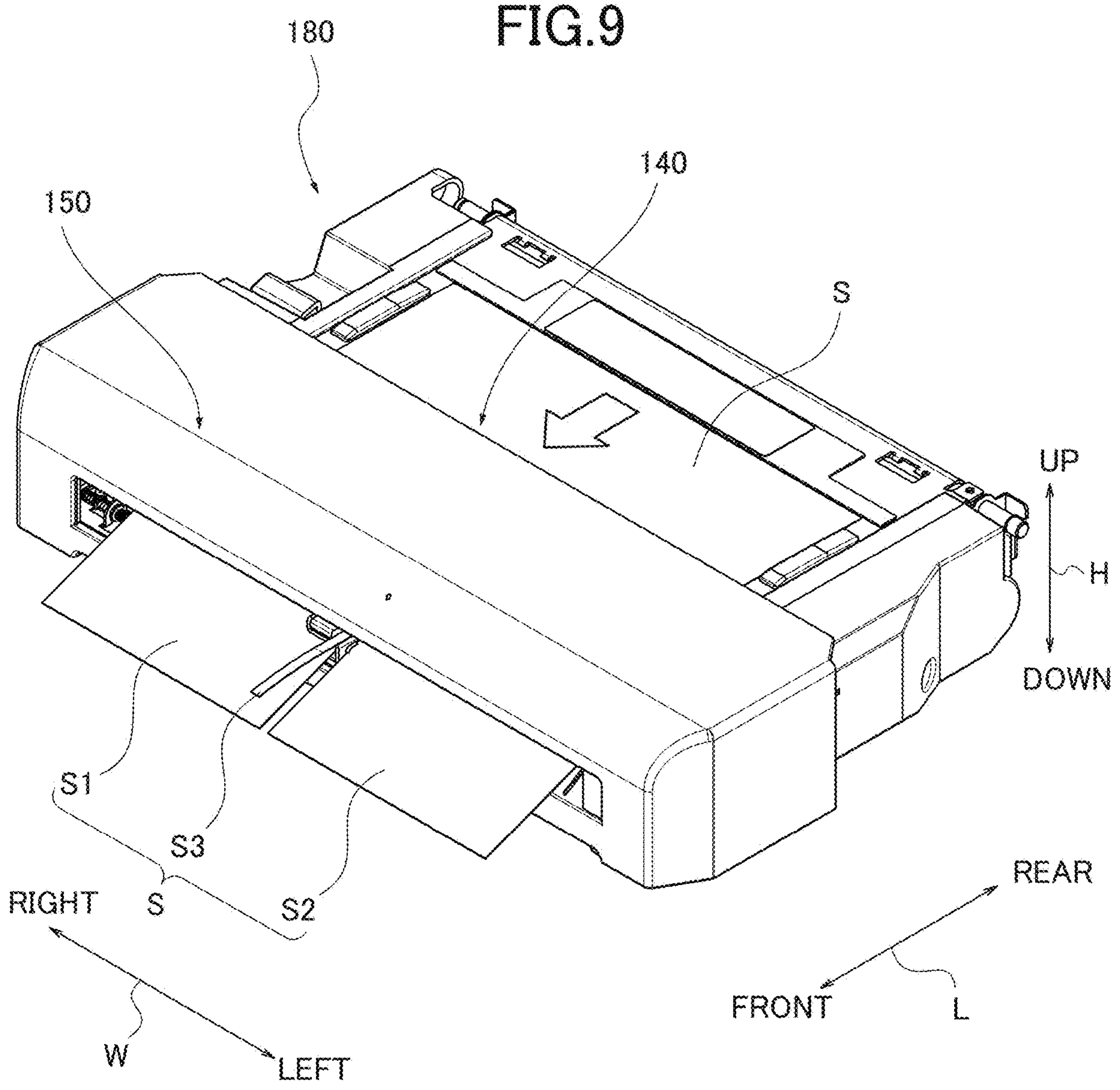
FIG. 9 is a perspective view showing an upper unit in which a cutter unit, a slitter unit, a discharge path, and a part of a printing standby path are integrally formed.
Figure 10:
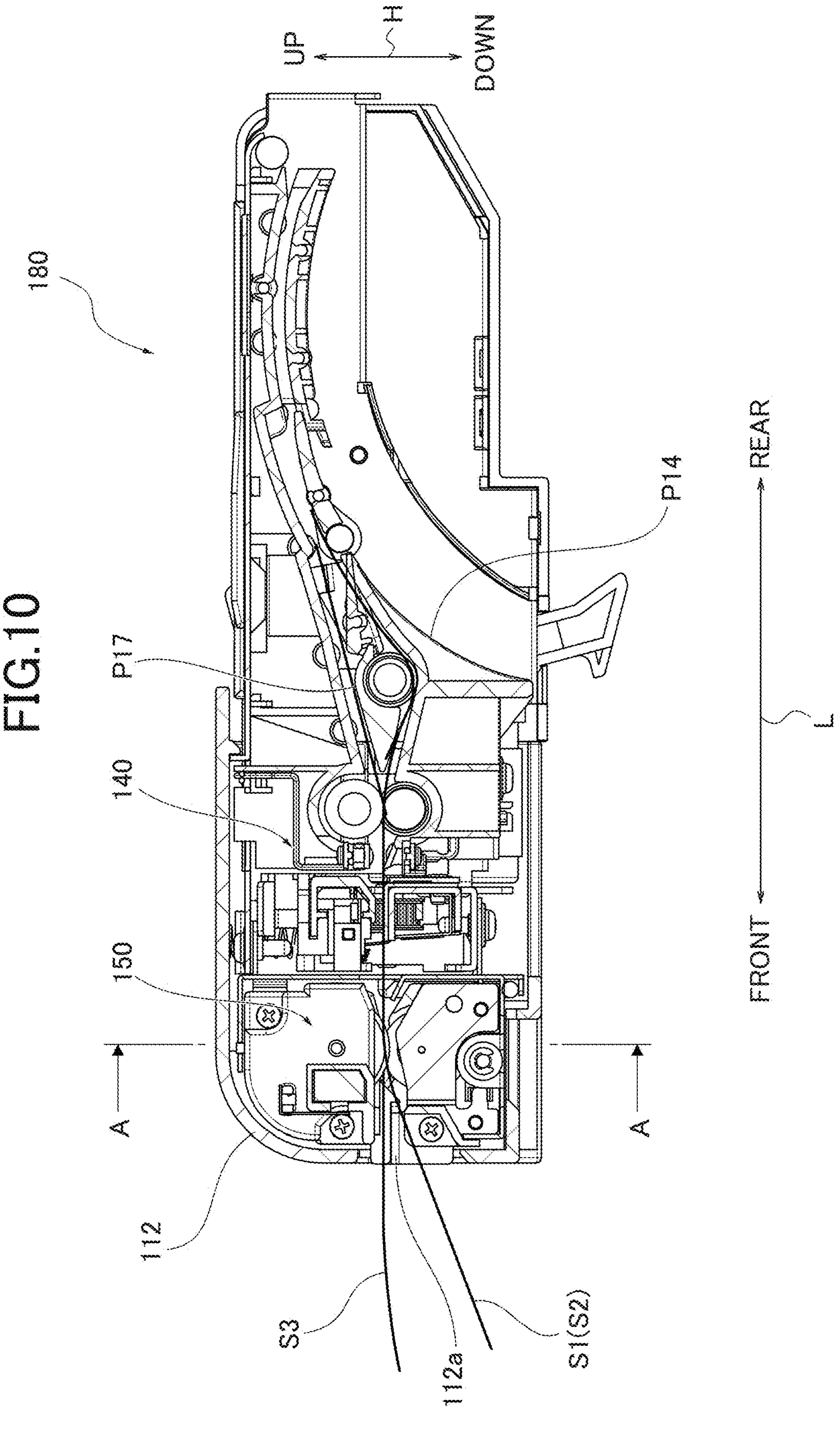
FIG. 10 is a cross-sectional view taken approximately at a center portion in the width direction W of the upper unit shown in FIG. 9 by a vertical plane that includes a front-rear direction.
Figure 11:
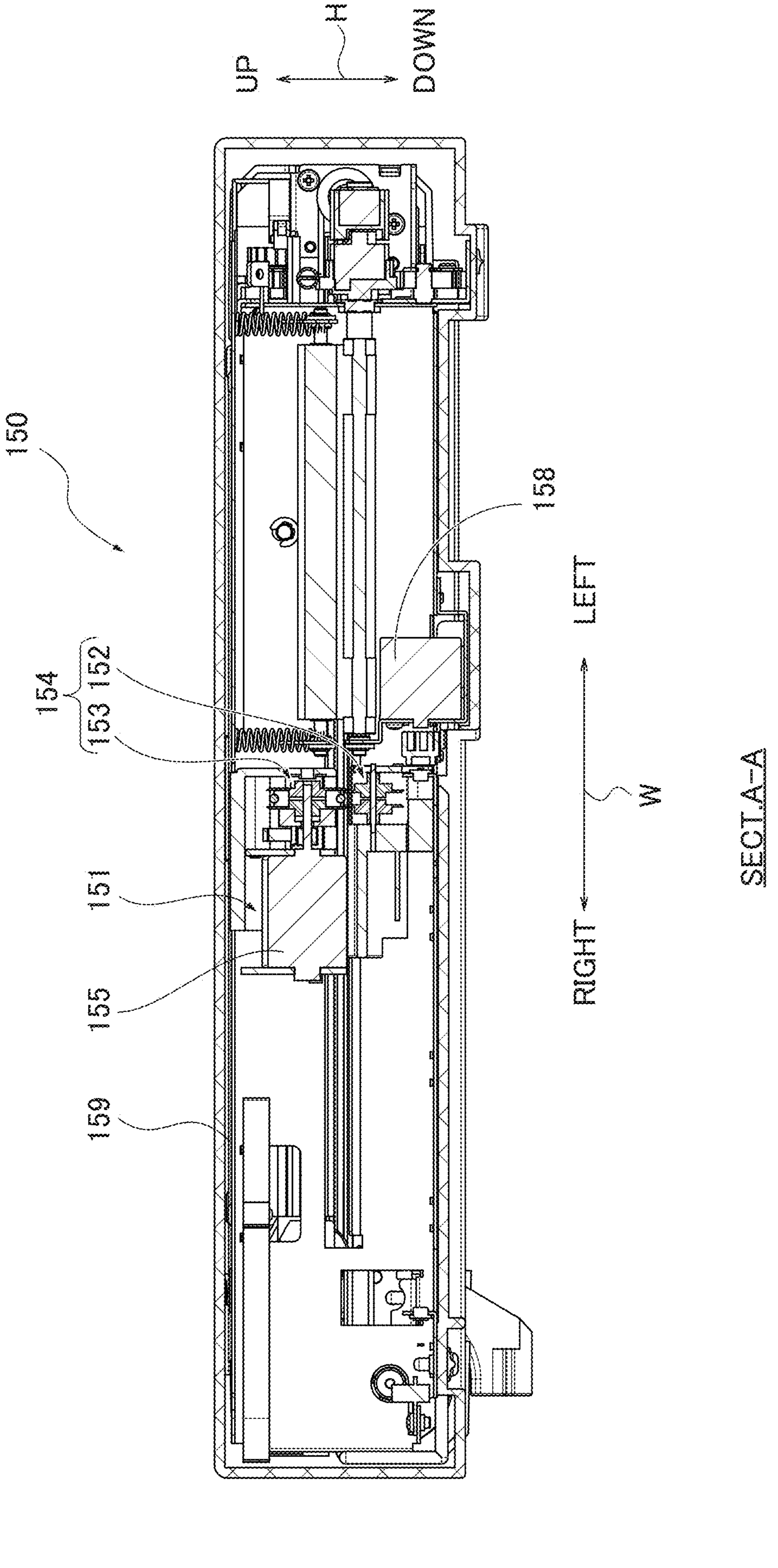
FIG. 11 is a cross-sectional view taken along a plane along the line A-A in the upper unit of FIG. 10.

[Cutter Unit] FIG. 9 is a perspective view showing an upper unit 180 in which the cutter unit 140, the slitter unit, the discharge path P17, and a part of the printing standby path P14 are integrally formed. FIG. 10 is a cross-sectional view taken approximately at a center portion in the width direction W of the upper unit 180 shown in FIG. 9 by a vertical plane that includes the front-rear direction L. FIG. 11 is a cross-sectional view taken along a plane along the line A-A in the upper unit 180 of FIG. 9.

The cutter unit 140 is provided on the discharge path P17. The cutter unit 140 includes a rotary blade that moves along the width direction W, and the paper S, R is cut along the width direction W by moving the rotary blade while the rotary blade rotates around the center of the rotary blade relative to the paper S, R passing through the discharge path P17. When cutting the sheet paper S, the cutter unit 140 cuts an unnecessary margin in the longitudinal direction of the sheet paper S. When cutting the roll paper R, the cutter unit 140 cuts a printed paper portion from a paper portion connected to the roll of the roll-paper storage compartment 115. The cutter unit 140 can cut an unnecessary margin in the longitudinal direction of the roll paper R, too. The cut margin are accumulated in the trash box (not shown in the drawings).

[Slitter Unit] Similar to the cutter unit 140, the slitter unit 150 is provided on the discharge path P17 and is disposed downstream of the cutter unit 140 in the transport direction, which is closer to the outlet 112*a*.

The slitter unit 150 includes a slitter blade set 154 disposed at a predetermined position in the width direction W. While the slitter unit 150 sends the paper S, R in the discharge path P17 downstream in the transport direction, the slitter blade set 154 is brought into contact with a predetermined position in the width direction W of the paper S, R, thereby cutting the paper S, R at the predetermined position in the width direction W along the transport direction.

Here, images are respectively printed on paper portions S1 and S2 on both sides in the width direction W. A paper portion S3 at the center in the width direction W is a portion including a boundary where the image printed on the paper portion S1 and that printed on the paper portion S2 are adjacent to each other.

If the slitter unit 150 cuts one paper S into two paper portions in the width direction W in order to make a division into two images aligned in the width direction W, the slitter unit 150 is required to make a cutting precisely along a boundary line between an image printed on one paper portion and that printed on the other paper portion.

However, it is difficult for the slitter unit 150 to cut precisely along the boundary line, because the paper S may be transported in a manner to be inclined toward one side in the width direction W or may turn into an oblique traveling in which the paper S is transported in an inclined posture relative to the transport direction in the transport path PP of the printer 100. If the cut line deviates from the boundary line, one paper portion will have an image printed thereon and a part of an image printed on the other paper portion as a protrusion, thereby lowering the quality of the paper portions obtained by cutting.

Thus, the slitter unit 150 according to the present embodiment cuts off a paper portion S3 with a predetermined width in the form of a strip, which includes a boundary line between the two images. This paper portion S3 is discarded as an intermediate trash. Therefore, as mentioned above, it is divided by cutting into three paper portions S1, S2, and S3.

When the printer 100 prints by forming a margin with a predetermined width between an image printed on the paper portion S1 and that printed on the paper portion S2, the slitter unit 150 may cut a portion including the margin as the paper portion S3, which becomes intermediate waste.

As shown in FIGS. 9 and 10, the slitter unit 150 according to the present embodiment cuts one sheet of paper S into three paper portions S1, S2, and S3 which are divided in the width direction W. In the slitter unit 150, as one example, the slitter blade set 154 in a slitter portion 151 is disposed at a position where the width of the paper portion S1 becomes equal to that of the paper portion S2. However, the slitter blade set 154 may be disposed at a position where the width of the paper portion S1 and that of the paper portion S2 are different from each other.

Since the central paper portion S3 is discarded as an intermediate trash, its width is extremely narrow (e.g., around 5 [mm]), as compared with the paper portions S1 and S2 on both sides on which images are printed.

In the following detailed description of the slitter unit 150, the cutting target is the paper S. However, it is possible to apply not only the paper S, but also the paper R as the cutting target.

Figure 12:
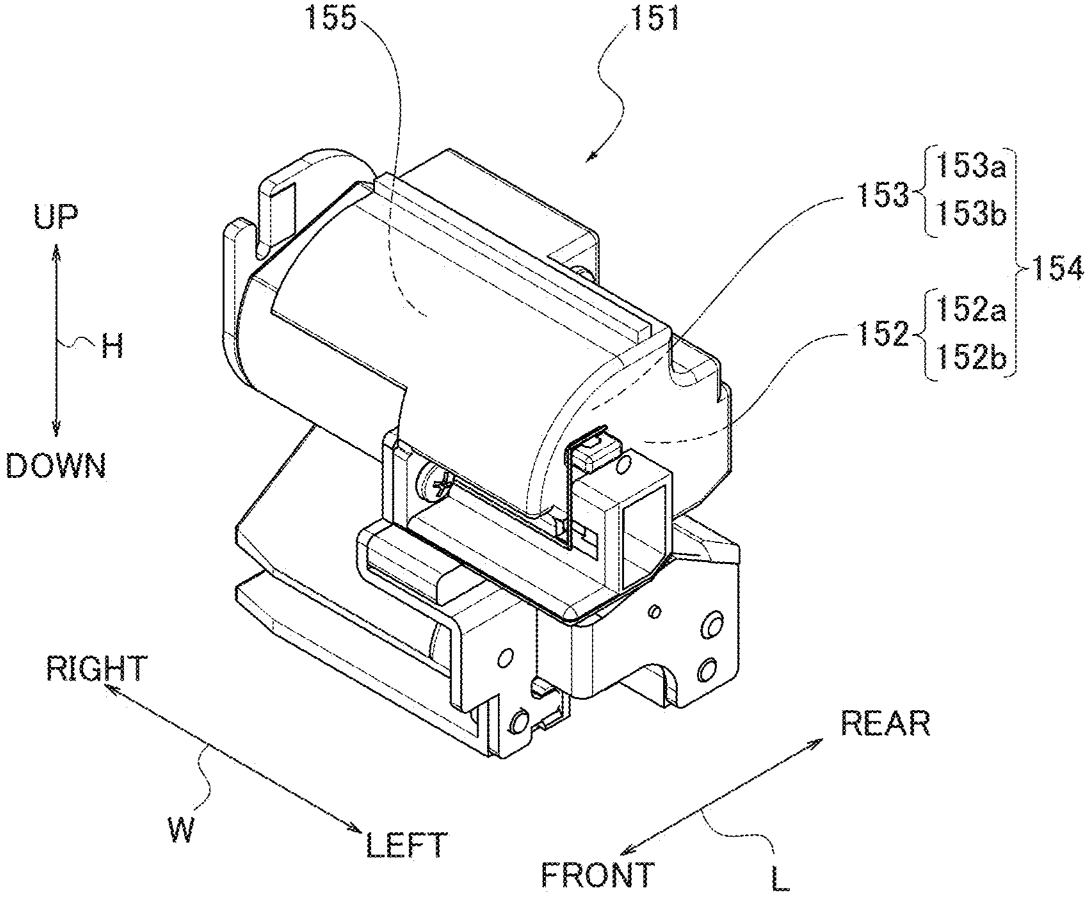
FIG. 12 is a perspective view showing a slitter portion in the slitter unit shown in FIG. 11.
Figure 13:
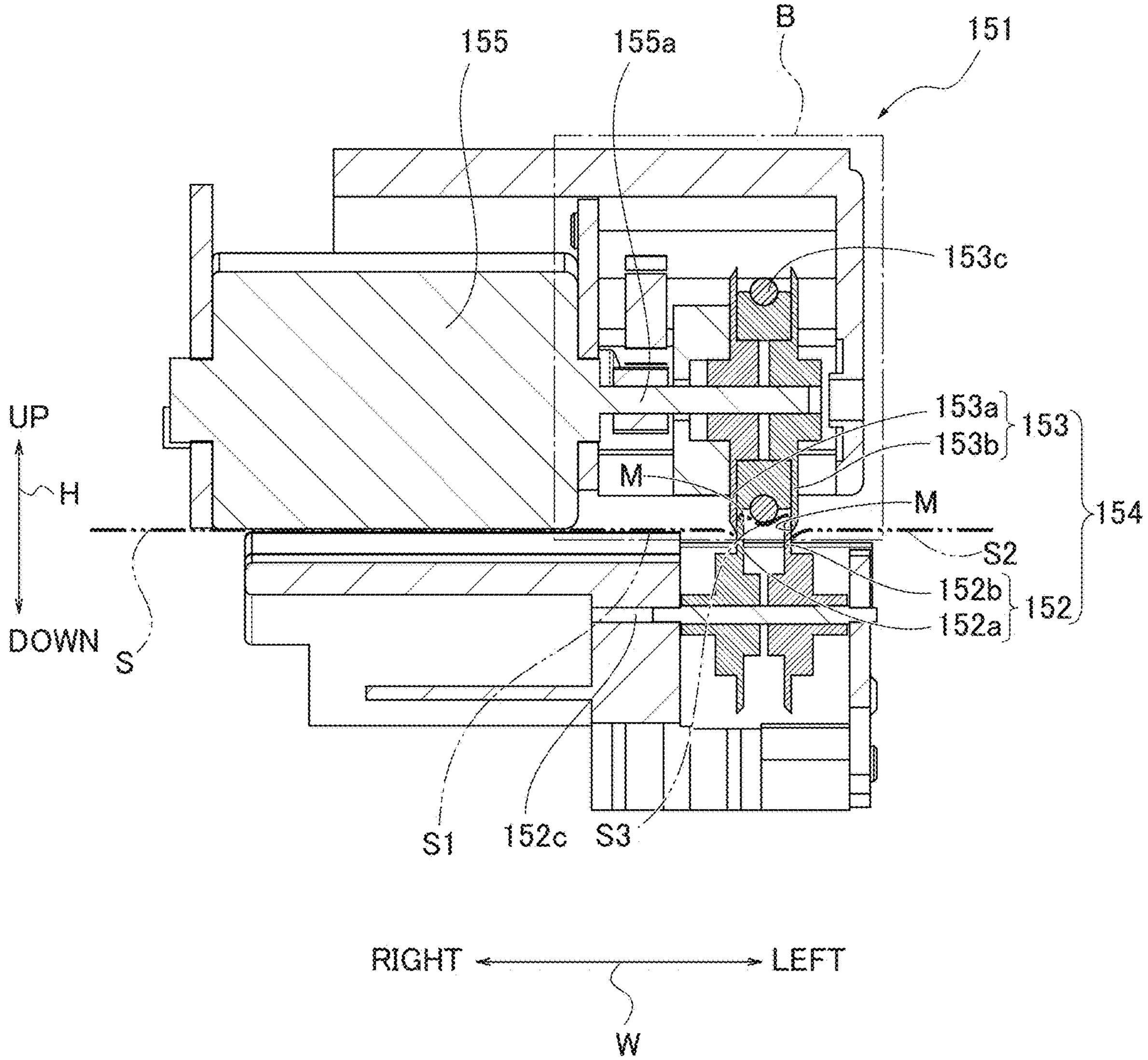
FIG. 13 is a cross-sectional view taken along a vertical plane including a shaft of a slitting motor in the slitter portion.
Figure 14:
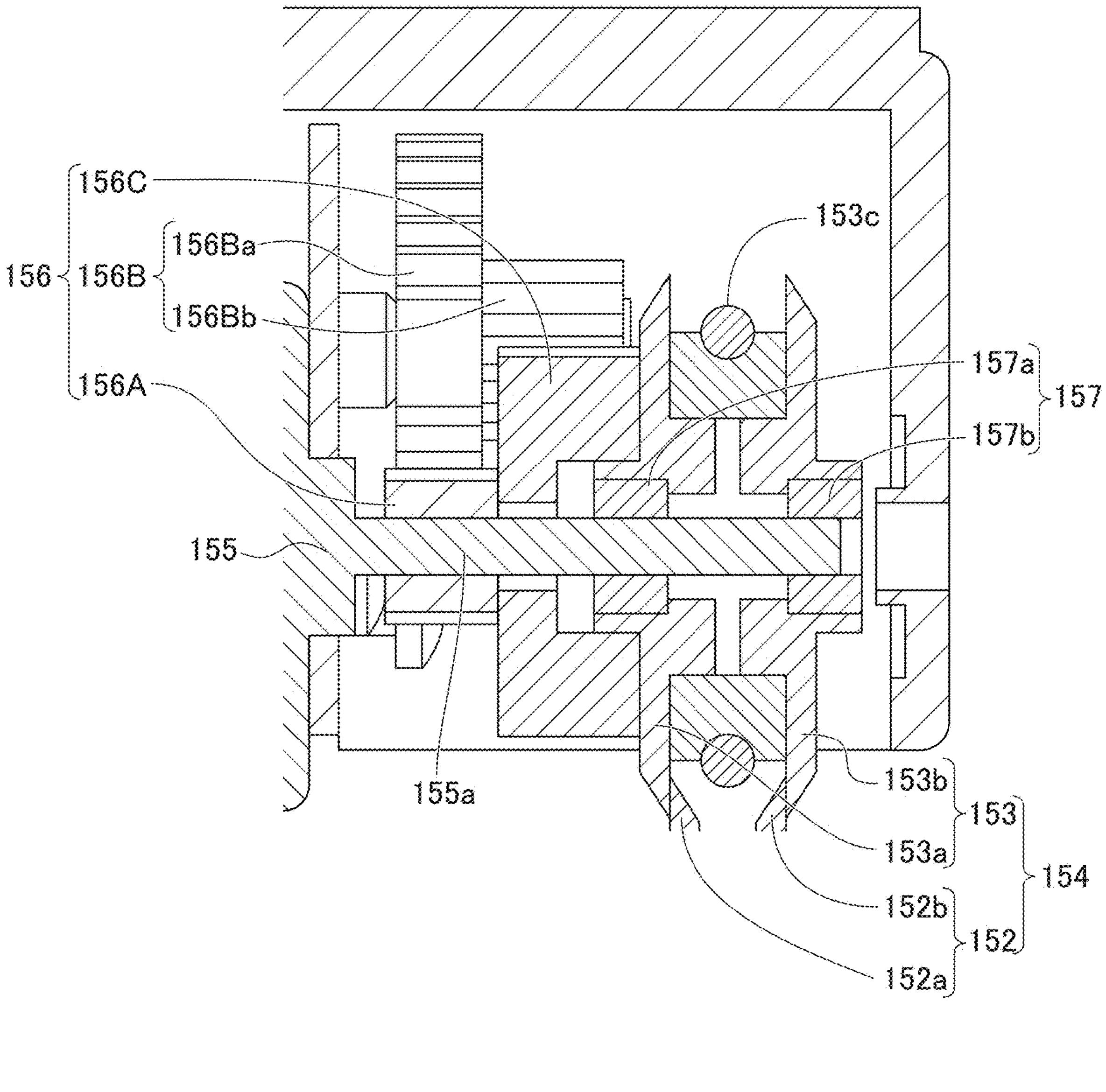
FIG. 14 is an enlarged view showing the details of an area B shown in FIG. 13.

FIG. 12 is a perspective view showing the slitter portion 151 in the slitter unit 150 shown in FIG. 11. FIG. 13 is a cross-sectional view taken along a vertical plane including a rotating shaft 155*a* of a slitting motor 155 in the slitter portion 151. FIG. 14 is an enlarged view showing the details of area B shown in FIG. 13. As shown in FIG. 11, the slitter unit 150 includes a unit base 159 (base), the slitter portion 151, and a slitter-portion moving mechanism 158.

The unit base 159 has a skeletal structure including a metal frame. The slitter portion 151 and the slitter-portion moving mechanism 158 are attached to the unit base 159. The unit base 159 is configured to attach the slitter unit 150 to the upper unit 180. It is possible to detach the slitter unit 150 by detaching the unit base 159 from the upper unit 180.

The slitter-portion moving mechanism 158 moves the slitter portion 151 along the width direction W. The slitter-portion moving mechanism includes, for example, a rotating motor for the movement, a guide rail extending in a straight line along the width direction W, and a transmission mechanism that moves the slitter portion 151 in a straight line along the direction (width direction W) in which the guide rail extends according to the rotation of the motor for the movement. As the motor for the movement, it is preferable to apply, for example, a linear stepper motor suitable for feed-forward control.

The controller 190 controls the operation of the slitter-portion moving mechanism 158. The slitter-portion moving mechanism 158 moves the slitter portion 151 to any position along the width direction W. This allows the slitter portion 151 to be placed at any position in the width direction W of the paper S.

As shown in FIGS. 13 and 14, the slitter portion 151 includes the slitting motor 155, the slitter blade set 154, and a gear train 156. The slitter blade set 154 includes an outer blade body 153 and an inner blade body 152. The controller 190 controls the driving and stopping operations of the slitting motor 155. In FIG. 13, the gear train 156 is omitted for simplification.

The outer blade body 153 includes two rotary blades 153*a*, 153*b* and a friction body 153*c* and is integrally configured. The two rotary blades 153*a*, 153*b* have the same shape. Each of the two rotary blades 153*a*, 153*b* has a blade formed on its circular outer peripheral portion.

As shown in FIG. 14, the gear train 156 includes a pinion gear 156A, a reduction gear 156B, and a drive gear 156C. The pinion gear 156A is fixed to the rotating shaft 155*a* (first shaft) of the slitting motor 155 and rotates together with the rotating shaft 155*a*. The reduction gear 156B includes a large-diameter gear 156Ba and a small-diameter gear 156Bb, which are coaxially and integrally formed. The large-diameter gear 156Ba is larger than the pinion gear 156A in diameter and the small-diameter gear 156Bb is smaller than the large-diameter gear 156Ba in diameter. The pinion gear 156A meshes with the large-diameter gear 156Ba of the reduction gear 156B to transmit the rotation of the pinion gear 156A. The small-diameter gear 156Bb rotates together with the large-diameter gear 156Ba.

The drive gear 156C is fitted over the rotating shaft 155*a* in a state where the rotation of the rotating shaft 155*a* is not directly transmitted and is freely rotatable around the rotating shaft 155*a*. The drive gear 156C meshes with the small-diameter gear 156Bb of the reduction gear 156B. As a result, the reduction gear 156B transmits the rotation of the pinion gear 156A to the drive gear 156C at a reduced speed. The drive gear 156C rotates on the rotating shaft 155*a* (around the rotating shaft 155*a*) in conjunction with the rotations of the pinion gear 156A and the reduction gear 156B.

In the present embodiment, the drive gear 156C is formed to be integral with the outer blade body 153. The drive gear 156C and the outer blade body 153 rotate coaxially. The outer blade body 153 is attached to the rotating shaft 155*a* via a bearing 157. Specifically, the rotary blade 153*a* is attached to the rotating shaft 155*a* via a bearing 157*a*, and the rotary blade 153*b* is attached to the rotating shaft 155*a* via a bearing 157*b*. In the bearing 157*a*, an outer race is fixed to the rotary blade 153*a*, and an inner race is fixed to the rotating shaft 155*a*. In the bearing 157*b*, an outer race is fixed to the rotary blade 153*b*, and an inner race is fixed to the rotating shaft 155*a*. This configuration can rotate the outer blade body 153 with a larger torque than that in the rotation by fixing the outer blade body 153 to the rotating shaft 155*a* of the slitting motor 155. The rotating shaft 155*a* extends along the width direction W of the paper S.

The two rotary blades 153*a*, 153*b* are disposed at a predetermined interval therebetween along the rotating shaft 155*a*. Each of the two rotary blades 153*a*, 153*b* has a blade formed on its circular outer peripheral portion. In the two rotary blades 153*a*, 153*b*, cutting edges at their outer peripheral portions are formed on their inner surfaces that are opposed to each other.

The friction body 153*c* is, for example, an elastic member such as an O-ring. The friction body 153*c* is disposed to bridge between the two rotary blades 153*a*, 153*b* of the outer blade body 153. When the two rotary blades 153*a*, 153*b* rotate, the friction body 153*c* rotates together with these rotary blades 153*a*, 153*b*.

An outer peripheral portion of the friction body 153*c* is shaped and disposed so as not to protrude outwardly beyond the cutting edges formed at the tips in the radial direction of the two rotary blades 153*a*, 153*b*. When the friction body 153*c* is in contact with the paper S, a considerable degree of frictional force is generated therebetween. Therefore, when the friction body 153*c* rotates, the paper S is transported in the tangential direction of the friction body 153*c* without sliding against the friction body 153*c*.

The inner blade body 152 includes two rotary blades 152*a*, 152*b* and a driven shaft 152*c* (second shaft). The two rotary blades 152*a*, 152*b* are identical in shape. Each of the two rotary blades 152*a*, 152*b* includes a blade formed at its circular outer peripheral portion.

The two rotary blades 152*a*, 152*b* are coaxially disposed on the driven shaft 152*c* fitted into through holes in the centers of the rotary blades 152*a*, 152*b*. The two rotary blades 152*a*, 152*b* rotate together with the driven shaft 152*c*. Since the driven shaft 152*c* is disposed parallel to the rotating shaft 155*a*, it extends along the width direction W of the paper S, similar to the rotating shaft 155*a*.

The driven shaft 152*c* is disposed below the rotating shaft 155*a* in the height direction H. In other words, the rotary blades 153*a*, 153*b* of the outer blade body 153 are disposed above the paper S passing through the slitter portion 151, and the rotary blades 152*a*, 152*b* of the inner blade body 152 are disposed below the paper S passing through the slitter portion 151.

The two rotary blades 152*a*, 152*b* are disposed at a predetermined interval therebetween along the driven shaft 152*c*. Each of the two rotary blades 152*a*, 152*b* includes a blade formed at its circular outer peripheral portion. In the two rotary blades 152*a*, 152*b*, cutting edges at their outer peripheral portions are formed on their outer surfaces that are opposite to the inner sides opposed to each other.

Here, as shown in FIG. 13, the two rotary blades 152*a*, 152*b* are disposed at positions such that a blade form on the outer surface of the rotary blade 152*a* contacts a blade formed on the inner surface of the rotary blade 153*a* of the outer blade body 153 to cut the sandwiched paper S by shearing between the two rotary blades 152*a*, 153*a* and a blade formed on the outer surface of the rotary blade 152*b* contacts a blade formed on the inner surface of the rotary blade 153*b* of the outer blade body 153 to cut the sandwiched paper S by shearing between the two rotary blades 152*b*, 153*b*.

In the slitter portion 151, the rotary blade 152*a* rotates by making a contact with the rotary blade 153*a* of the outer blade body 153, which is rotated by the slitting motor 155, thereby cutting the paper S by shearing between the rotating two rotary blades 152*a*, 153*a*. At the same time, in the slitter portion 151, the rotary blade 152*b* rotates by making a contact with the rotary blade 153*b* of the outer blade body 153 rotated by the slitting motor 155, thereby cutting the paper S by the shearing between the rotating two rotary blades 152*b*, 153*b*.

Thus, as shown in FIG. 9, the paper S is transported in the transport direction shown by the white arrow. As shown in FIG. 13, the paper S passes between the outer blade body 153, which is disposed on a relatively upper side in the height direction H, and the inner blade body 152, which is disposed on a relatively lower side in the height direction H. With this, as shown in FIG. 9, the paper S is cut into the three paper portions S1, S2, S3 in the width direction W by the slitter unit 150.

Figure 15:
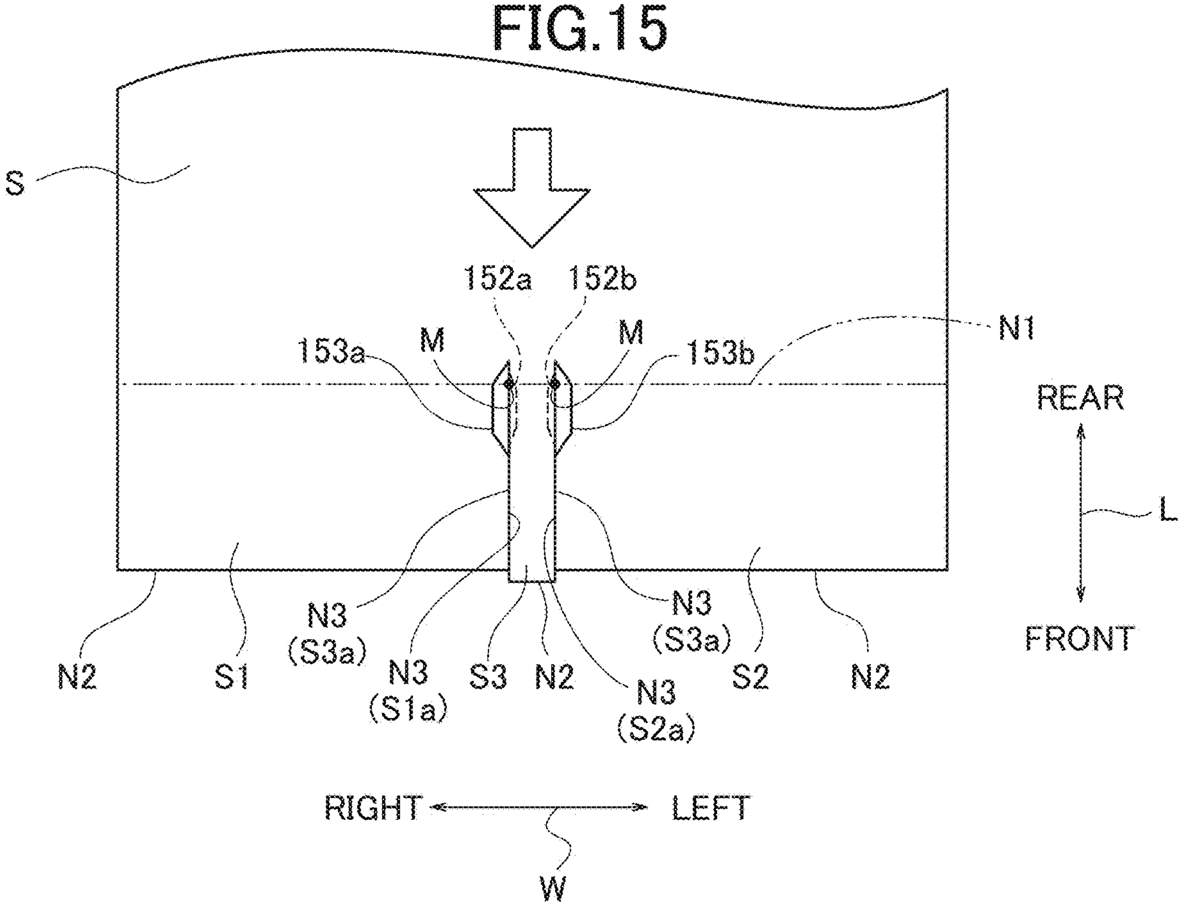
FIG. 15 is a schematic plan view showing cutting lines dividing into both side portions of the paper and a center portion of the paper, and starting points of the cutting lines.
Figure 16:
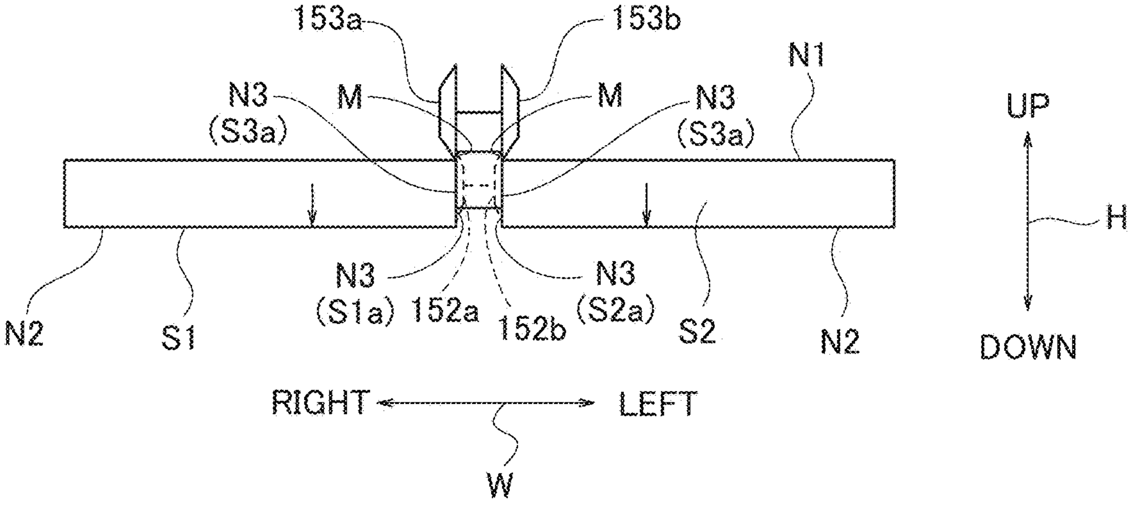
FIG. 16 is a schematic view showing the condition of FIG. 15, taken from the front toward the rear in the transport direction.

FIG. 15 is a schematic plan view showing cutting lines N3 dividing into both side portions S1, S2 of the paper and a center portion S3 of the paper, and starting points M of the cutting lines N3. FIG. 16 is a schematic view showing the condition of FIG. 15, taken from the front toward the rear in the transport direction. The reference sign N1 in FIGS. 15 and 16 and FIGS. 17 and 18 indicate a line along the width direction W passing through the starting points M of the cutting lines N3 on the top surface of the paper S.

Specifically, as shown in FIG. 15, the slitter portion 151 divides the paper S into the right-side paper portion S1 in the width direction W and the center paper portion S3, which becomes an intermediate trash, by the shearing between the rotary blades 153*a*, 152*a* disposed on the right side in the width direction W, and divides it into the left-side paper portion S2 in the width direction W and the center paper portion S3, which becomes an intermediate trash, by the shearing between the rotary blades 153*b*, 152*b* disposed on the left side in the width direction W.

Here, when the slitter portion 151 has cut the paper S into the three paper portions S1, S2, S3, as shown in FIG. 15, the starting points M of the cutting lines N3 for cutting into the paper portions S1, S2, S3 are at positions on the inner surfaces in the width direction W of the rotary blades 153*a*, 153*b* in the outer blade body 153.

In the slitter unit 150 according to the present embodiment, the outer blade body 153 is disposed above the inner blade body 152 in the height direction H. Therefore, portions outside the starting points M of both side paper portions S1, S2 cut at the cutting lines N3 are pressed downward by areas respectively having thicknesses of the rotary blades 153*a*, 153*b* constituting the outer blade body 153, and both side paper portions S1, S2 hang downward by gravity, too.

In other words, the portions outside the starting points M of both side paper portions S1, S2 are prevented from riding on the rotary blades 153*a*, 153*b* of the outer blade body 153 and from being pressed outside in the width direction W by the thicknesses of the rotary blades 153*a*, 153*b*.

Therefore, even if the paper S is thick, it is possible by the slitter unit 150 according to the present embodiment and the printer 100 with this slitter unit 150 to form side edges S1*a*, S2*a*, which correspond to the cutting lines N3, in both side paper portions S1, S2 as areas where images are printed, into a nicely linear shape, without forming into a condition in which they are zigzag, finely waved and finely wrinkled.

Figure 17:
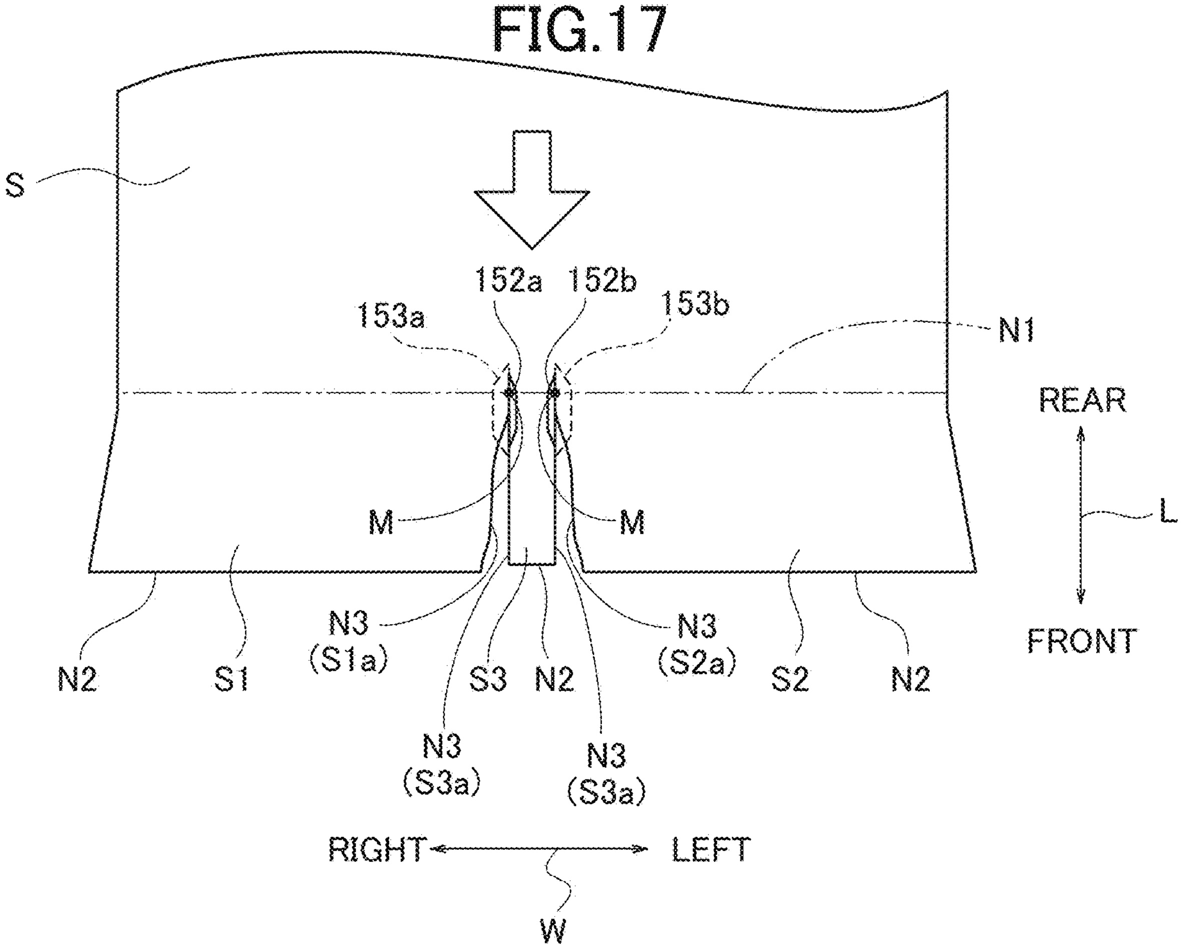
FIG. 17 is a schematic view similar to FIG. 15, but showing those in a slitter unit of a comparative example to which the present disclosure is not applied.
Figure 18:
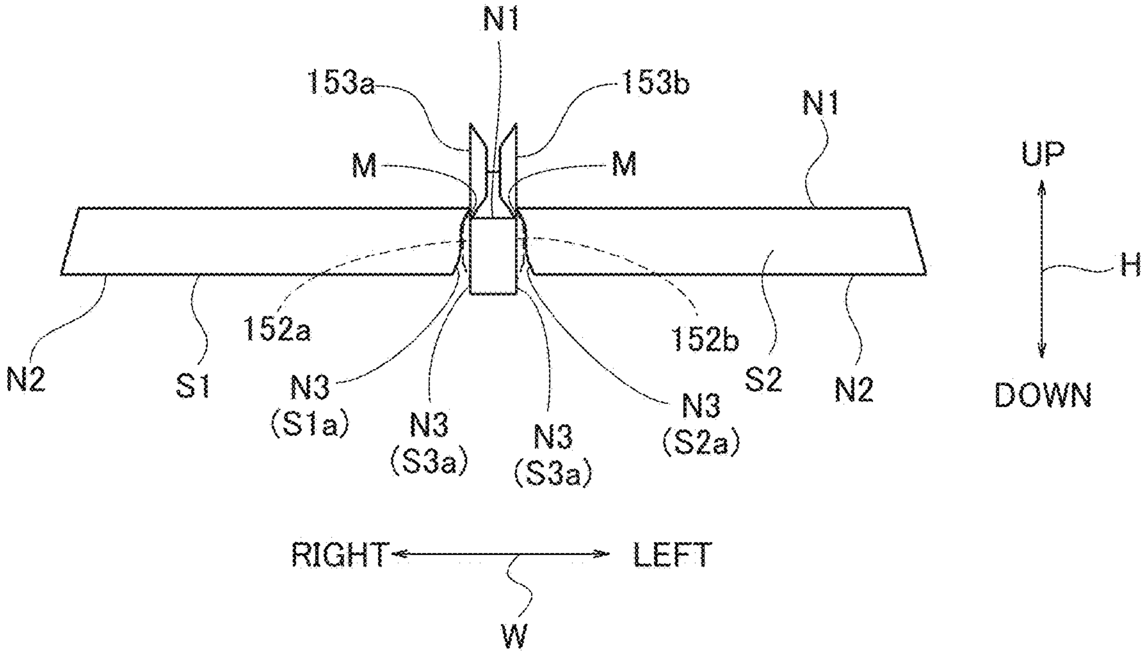
FIG. 18 is a schematic view similar to FIG. 16, but showing that in the slitter unit of the comparative example to which the present disclosure is not applied.

<Slitter Unit of Comparative Example> In order to facilitate understanding the slitter unit according to the above-mentioned embodiments, a slitter unit according to a comparative example, to which the present disclosure is not applied, will be described. FIG. 17 is a schematic view similar to FIG. 15, but showing those in a slitter unit of the comparative example to which the present disclosure is not applied. FIG. 18 is a schematic view similar to FIG. 16, but showing that in the slitter unit of the comparative example to which the present disclosure is not applied.

As shown in FIGS. 17 and 18, in the slitter unit according to the comparative example, the inner blade body 152 is disposed above the outer blade body 153 in the height direction H. Therefore, portions outside the starting points M of both side paper portions S1, S2 cut at the cutting lines N3 are pressed upward by areas respectively having thicknesses of the rotary blades 153*a*, 153*b* constituting the outer blade body 153 disposed below the paper S.

However, since gravity acts downward on the paper portions S1, S2 pressed upward by the rotary blades 153*a*, 153*b*, side edges S1*a*, S2*a*, which correspond to the cutting lines N3, of both side paper portions S1, S2 escape outside of the thicknesses of the rotary blades 153*a*, 153*b*.

In other words, ahead of the starting points M in the transport direction, the side edges S1*a*, S2*a*, which correspond to the cutting lines N3, of the paper portions S1, S2 are displaced outward in the width direction W from both side edges S3*a*, corresponding to the cutting lines N3, on both sides of the paper portion S3 which becomes an intermediate trash. The outward displacement of the side edges S1*a*, S2*a* causes stress to pull cutting edges at the starting points M of the cutting where the cutting blades of a slitter apparatus are in contact with both of the side paper portions.

In the slitter unit according to the comparative example, the stress generated at the starting points M gives adverse effects on the formation of the side edges S1*a*, S2*a* of the paper portions S1, S2, which correspond to the cutting lines N3 formed subsequently from the starting points M. In particular, when the paper S is a thick paper used for the dye-sublimation thermal printer 100, each side edge S1*a* and S2*a* of the paper portions S1 and S2 does not become finely rippled, wrinkled, or creased, and is not cleanly formed into a clear straight-line shape.

As a result, the printer according to the comparative example causes the paper portions S1, S2 on both sides to fail to have a clear straight-line shape, thereby degrading the external appearance quality (appearance).

Unlike the slitter unit according to the comparative example, the slitter unit 150 according to the present embodiment can form the side edges S1*a*, S2*a*, which correspond to the cutting lines N3, in both paper portions S1, S2 on which images have been printed, into clear straight lines, without causing the side edges to become finely rippled, wrinkled, or creased.

In the slitter unit according to the present embodiment, the inner blade body 52 pushes up the center paper portion S3, which becomes an intermediate trash, and then the paper portion S3 hangs downward ahead of that. Therefore, both side edges S3*a*, S3*a* of the paper portion S3, which correspond to the cutting lines N3, may become finely rippled, wrinkled, or creased. However, since the paper portion S3 is discarded as an intermediate trash any waviness or distortion in the side edges S3*a*, S3*a* does not affect the quality of the output paper portions S1, S2.

As shown in FIG. 13, in the slitter unit 150 according to the present embodiment, the paper portion S3, which becomes an intermediate trash, is pressed against the friction body 153*c* of the outer blade body 153, in a condition that it is pushed upward in the height direction H by the inner blade body 152 disposed below the paper S. Since the outer blade body 153 is moved to rotate by the slitting motor 155, the friction body 153*c* also rotates. Since the paper portion S3 is pressed against the friction body 153*c*, it does not slide on the friction body 153*c*.

The paper portion S3 may have pressure marks or pressure scratches on its surface due to its pressing against the friction body 153*c*. The paper portion S3 is, however, a portion that is discarded as an intermediate trash. Therefore, it does not affect the quality of the output paper portions S1, S2.

Thus, the slitter unit 150 can guide the center paper portion S3, which has been separated from both paper portions S1, S2, forward in the discharge direction in a condition where it is in contact with the friction body 153*c*, and can prevent the paper portion S3 from being swept out in an unintended direction or winding around the outer blade body 153.

Figure 19:
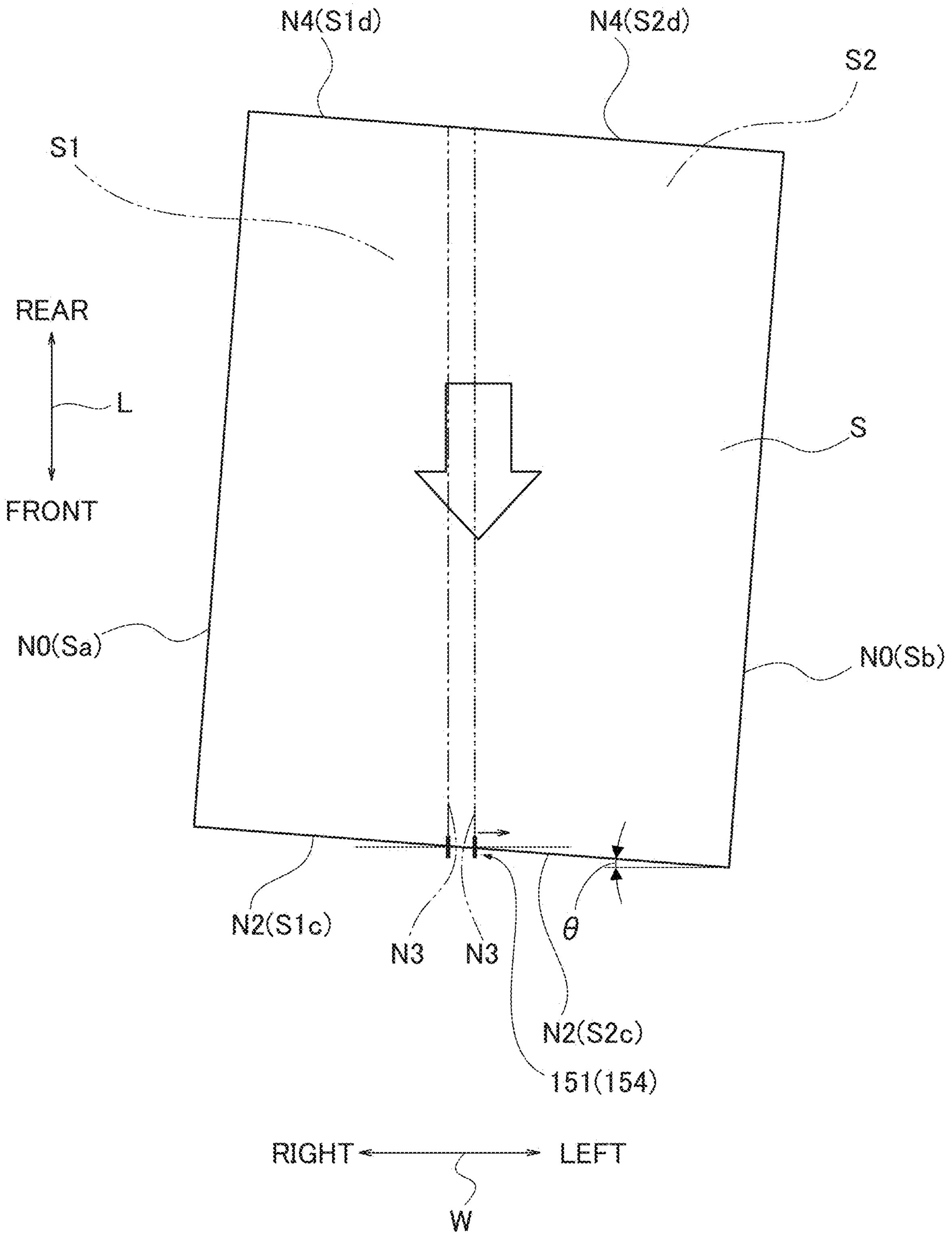
FIG. 19 is a schematic plan view showing cutting lines in an oblique traveling of the paper.
Figure 20:
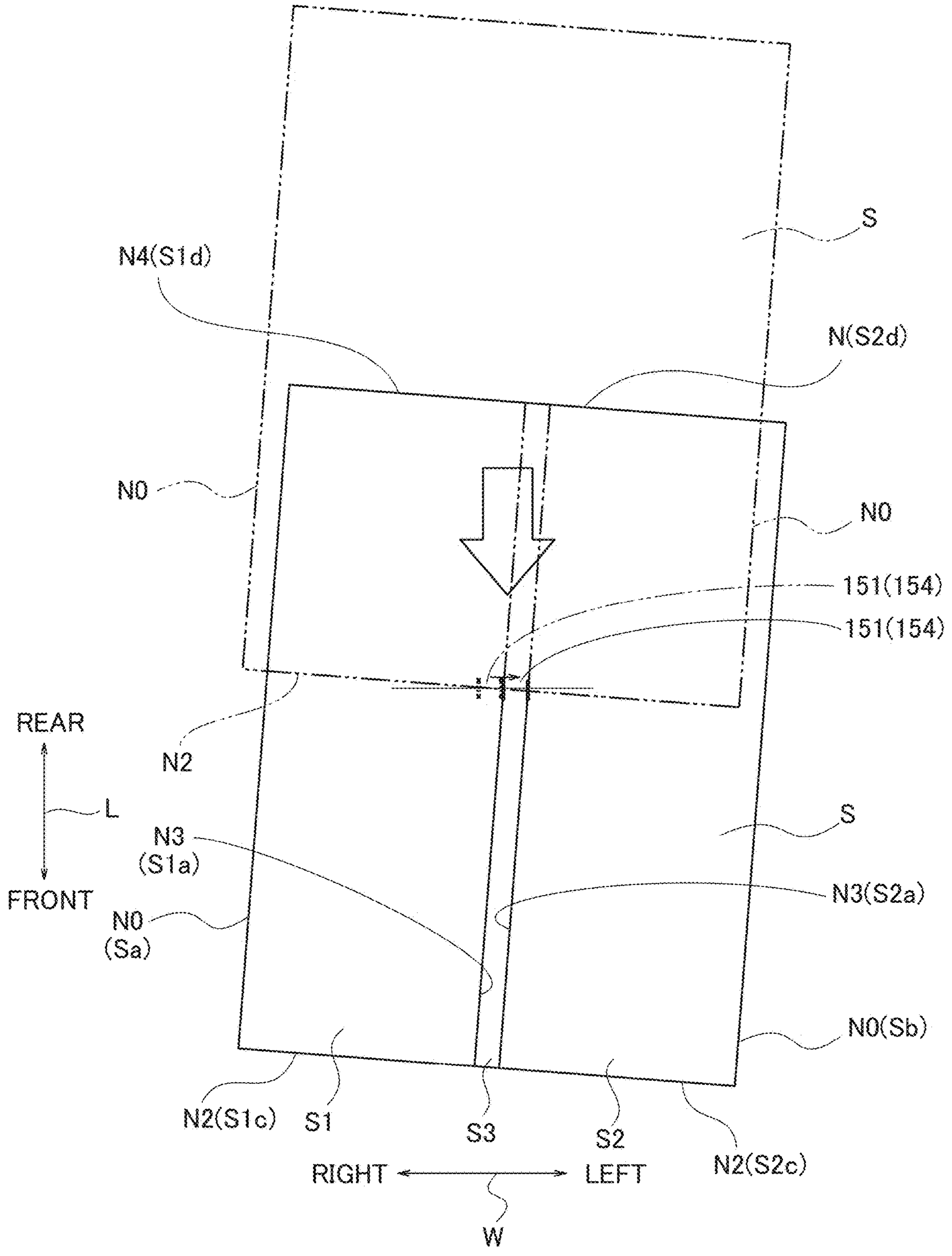
FIG. 20 is a schematic plan view showing cutting lines in the movement of the slitter portion (slitter blade set) to cancel the amount of the oblique traveling.

FIG. 19 is a schematic plan view showing the cutting lines N3 in an oblique traveling of the paper S. FIG. 20 is a schematic plan view showing the cutting lines N3 in the movement of the slitter portion 151 (slitter blade set 154) to cancel the amount of the oblique traveling.

Here, the printer 100 may cause a slightly oblique traveling to the paper S, which passes through the transport path PP, by the accumulation of individual differences of its components. The amount of the oblique traveling also differs for each printer 100. When the slitter portion 151 conducts the cutting in the oblique traveling condition during the passing of the paper S through the discharge path P17, the side edges Sa, Sb on both sides NO of the paper S prior to its cutting may not become parallel to the side edges S1*a*, S2*a* corresponding to the cutting lines N3 made by the cutting of the slitter portion 151. This may cause lowering of the quality of the paper portions S1, S2.

However, the slitter unit 150 according to the present embodiment includes the slitter-portion moving mechanism 158. As shown in FIG. 19, the slitter-portion moving mechanism 158 can move the slitter portion 151 along the width direction W. In the printer 100 according to the present embodiment, the controller 190 stores the amount of the oblique traveling due to the individual difference for each printer 100 measured in advance. While the paper S is transported in the transport direction (front-rear direction L), the controller 190 controls the slitter-portion moving mechanism 158 so as to move the slitter portion 151 in the direction to cancel the oblique traveling according to the amount of the oblique traveling stored as above.

With this, as shown in FIG. 20, even if the oblique traveling of the paper S occurs, the printer 100 according to the present embodiment cuts the paper S in a manner to move the slitter portion 151 so as to cancel the amount of the oblique traveling while the paper S is transported in the transport direction (front-rear direction L). With this, it is possible to make the side edges S1*a*, S2*a*, which correspond to the cutting lines N3 made by the cutting of the slitter portion 151, parallel to the side edges Sa, Sb on both sides NO of the paper S prior to the cutting. This makes it possible to conduct the cutting in a manner to cancel the oblique traveling.

In other words, even if the printer 100 transports the paper S by the oblique traveling, it can output the paper portion S1 with both side edges Sa, S1*a*, which are parallel to each other, and the paper portion S2 with both side edges Sb, S2*a*, which are parallel to each other.

As shown in FIG. 19, the paper S is cut by each printer 100 in advance for the measurement without moving the slitter portion 151 (slitter blade set 154). Then, a comparison is made between the length of an edge S1*c* (edge S2*c* in the case of the paper portion S2) corresponding to a front edge N2 in the paper portion S1 (or paper portion S2) and that of an edge S1*d* (edge S2*d* in the case of the paper portion S2) corresponding to a rear edge N4. Then, the difference between the length of the edge S1*c* and that of the edge S1*d* (or difference between the length of the edge S2*c* and that of the edge S2*d*) is calculated. As a result, it is possible to measure the amount of the oblique traveling due to an individual difference for each printer 100.

As shown in FIG. 20, it suffices to control the slitter-portion moving mechanism 158 by the controller 190 of the printer 100, so as to move the slitter portion 151 (slitter blade set 154) along the width direction W at a constant speed, by the length corresponding to the amount of the oblique traveling measured in advance by the above-mentioned exemplary method, during the transport of the paper S by the length along its transport direction (corresponding to the front-rear direction L) (length from an edge Sc of the front end N2 to an edge Sd of the rear end N4).

In the slitter unit 150 according to the present embodiment, the slitter-portion moving mechanism 158 has been described as one that moves the slitter portion 151 for canceling the amount of the oblique traveling of the paper S. The slitter-portion moving mechanism 158 may be, however, one that moves the slitter portion 151 along the width direction W for changing the dimensional ratio of the width between the paper portions S1 and S2.

Thus, when the slitter-portion moving mechanism 158 is allowed to operate for changing the dimensional ratio of the width between the paper portions S1 and S2, it suffices to move the slitter portion 151 in the width direction W by the slitter-portion moving mechanism 158, before the edge Sc of the front end N2 of the paper S reaches the slitter portion 151. During the period from when the edge Sc of the front end N2 of the paper S starts passing the slitter portion 151 until when the edge Sc of the rear end N4 passes the slitter portion 151, it suffices to fix the slitter portion 151 at a position without moving it by the slitter-portion moving mechanism 158.

However, even in this case, when moving the slitter portion 151 to cancel the oblique traveling of the paper S as mentioned above, the slitter-portion moving mechanism 158 can move the slitter portion 151 during the period from when the edge Sc of the front end N2 of the paper S starts passing the slitter portion 151 until when the edge Sd of the rear end N4 passes the slitter portion 151.

Although the slitter unit 150 according to the present embodiment includes the slitter-portion moving mechanism 158, the slitter apparatus and printer according to the present disclosure may not include a slitter-portion moving mechanism.

The slitter unit 150 according to the present embodiment is configured by inserting the rotating shaft 155*a* of the slitting motor 155 into the rotary blades 153*a*, 153*b* of the outer blade body 153. The rotating shaft 155*a* of the slitting motor 155 may be, however, inserted into the rotary blades 152*a*, 152*b* of the inner blade body 152.

The embodiments according to the present disclosure have been specifically described as above. The present disclosure is not limited to these embodiments, but, of course, can be modified within the scope of the technical concept of the present disclosure.

For example, in the first embodiment, the slitter portion is moved by the slitter-portion moving mechanism controlled by the controller, but it is, of course, possible to manually move the slitter portion from the standby position to the cutting position.

In the second embodiment, the outer blade body is rotated by the slitting motor via the gear train. However, the rotating shaft (first shaft) of the slitting motor may be fitted into through holes provided at the centers of the two rotary blades, thereby making a coaxial arrangement. In this case, the two rotary blades are integrally rotated with the rotating shaft "a" according to the rotation of the slitting motor.

In connection with the description of the above embodiments, the following is further disclosed.

(1) A slitter apparatus includes a base and a slitter portion that is attached to the base. The slitter portion includes an outer blade body including two rotary blades that are disposed on a first shaft, which extends in the width direction, with an interval therebetween; an inner blade body including two rotary blades that are disposed on a second shaft, which extends in the width direction, with an interval therebetween; and a motor that is configured to rotate the first shaft or the second shaft. The outer blade body is disposed outside of the inner blade body in the width direction such that a first one of the two rotary blades of the outer blade body and a first one of the two rotary blades of the inner blade body are configured to cut the paper therebetween and that a second one of the two rotary blades of the outer blade body and a second one of the two rotary blades of the inner blade body are configured to cut the paper therebetween. The outer blade body is disposed on an upper side of the paper and the inner blade body is disposed on a lower side of the paper.

(2) In the slitter apparatus according to (1), a friction body is provided between the two rotary blades of the outer blade body. The friction body is configured to make sliding-free contact with a center portion of the paper in the width direction. The center portion is one of three portions obtained by cutting the paper and being pushed upward by the inner blade body between the two rotary blades of the inner blade body.

(3) The slitter apparatus according to (2), further includes a slitter-portion moving mechanism that is configured to move the slitter portion along the width direction. The slitter-portion moving mechanism is configured to move the slitter portion in the width direction in accordance with an amount of oblique traveling of the paper when the paper is cut by the slitter portion, so as to cancel the amount of the oblique traveling.

(4) A printer including a printing section that is configured to print on a paper; and the slitter apparatus according to any one of (1) to (3) that is configured to cut the paper, which has been printed by the printing section, at a predetermined position in a width direction of the paper.

The invention claimed is:

1. A printer comprising:

a motor comprising a rotating shaft;

a pinion gear that is fixed to the rotating shaft and configured to rotate integrally with the rotating shaft;

a reduction gear that is configured to transmit a rotation of the pinion gear at a reduced speed;

a drive gear that receives the rotating shaft in a state in which a rotation of the rotating shaft is not directly transmitted to the drive gear, the drive gear being configured to rotate on the rotating shaft in conjunction with the rotation of the pinion gear and a rotation of the reduction gear;

a drive rotary blade that is integral with the drive gear and configured to rotate coaxially with the drive gear;

a driven rotary blade that is configured to rotate by partially contacting the drive rotary blade; and a slitter portion that is configured to cut a paper that passes between the drive rotary blade and the driven rotary blade in a transport direction orthogonal to the rotating shaft.

2. The printer according to claim 1, wherein at least a part of an outer peripheral surface of a housing of the motor comprises a flat surface, wherein the flat surface is positioned to face the paper that travels on the transport path, and wherein the motor is installed in an inclined state by a predetermined angle about the rotating shaft relative to the transport path such that a gap between the paper, which travels on the transport path, and the flat surface is gradually narrowed.

3. The printer according to claim 2, wherein an opposing surface that is opposed to the flat surface of the motor is substantially parallel to the flat surface, the opposing surface comprising a passage member that is formed to be inclined relative to the transport path.

4. The printer according to claim 1, wherein the drive rotary blade is fixed to the rotating shaft via a bearing that comprises an outer race fixed to the drive rotary blade and an inner race fixed to the rotating shaft.

5. The printer according to claim 1, further comprising a slitter-portion moving mechanism that is configured to move the slitter portion such that the drive rotary blade and the driven rotary blade are positioned at a predetermined position on a transport path of the paper.

6. The printer according to claim 5, wherein the paper has a width of 8 inches (approximately 20.32 centimeters), and wherein the slitter portion is configured to be movable by the slitter-portion moving mechanism from a position where the paper is not cut to a position where the paper is cut to have a width of 6 inches (approximately 15.24 centimeters).

7. The printer according to claim 1, wherein the drive rotary blade is an outer blade body comprising two rotary blades that are disposed on the rotating shaft with an interval therebetween, the rotating shaft extending in a width direction of the paper, wherein the driven rotary blade is an inner blade body comprising two rotary blades that are disposed in the width direction with an interval therebetween, wherein the outer blade body is disposed outside of the inner blade body in the width direction such that a first one of the two rotary blades of the outer blade body and a first one of the two rotary blades of the inner blade body are configured to cut the paper therebetween and that a second one of the two rotary blades of the outer blade body and a second one of the two rotary blades of the inner blade body are configured to cut the paper therebetween, and wherein the outer blade body is disposed on an upper side of the paper and the inner blade body is disposed on a lower side of the paper.

8. The printer according to claim 7, wherein a friction body is provided between the two rotary blades of the outer blade body, and wherein the friction body is configured to make sliding-free contact with a center portion of the paper in the width direction, the center portion being one of three portions obtained by cutting the paper and being pushed upward by the inner blade body between the two rotary blades of the inner blade body.

9. The printer according to claim 8, further comprising a slitter-portion moving mechanism that is configured to move the slitter portion along the width direction, wherein the slitter-portion moving mechanism is configured to move the slitter portion in the width direction in accordance with an amount of oblique traveling of the paper when the paper is cut by the slitter portion, so as to cancel the amount of the oblique traveling.

* * * * *